(12) United States Patent
Teruya et al.

(10) Patent No.: US 11,275,295 B2
(45) Date of Patent: Mar. 15, 2022

(54) IMAGE CAPTURING SYSTEM TO WHICH ACCESSORY CAN BE EASILY ATTACHED, IMAGE CAPTURING APPARATUS, AND ACCESSORY

(71) Applicant: CANON KABUSHIKI KAISHA, Tokyo (JP)

(72) Inventors: Yuko Teruya, Yokohama (JP); Yusuke Mogi, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/934,324

(22) Filed: Jul. 21, 2020

(65) Prior Publication Data
US 2021/0055638 A1    Feb. 25, 2021

(30) Foreign Application Priority Data
Aug. 20, 2019  (JP) .............................. JP2019-150320

(51) Int. Cl.
*G03B 17/56*   (2021.01)
*G03B 17/14*   (2021.01)
*G02B 7/36*    (2021.01)

(52) U.S. Cl.
CPC ............. *G03B 17/566* (2013.01); *G02B 7/36* (2013.01); *G03B 17/14* (2013.01)

(58) Field of Classification Search
CPC .. G03B 17/566; G03B 17/563; G03B 17/561; G03B 17/56; G03B 17/14; G03B 17/02; G02B 7/36; H04N 5/2251
See application file for complete search history.

(56) References Cited

U.S. PATENT DOCUMENTS

2012/0162503 A1 *  6/2012  Yano .................... G03B 17/566
                                                             348/376

FOREIGN PATENT DOCUMENTS

| JP | 05292367 A | * | 11/1993 |
| JP | 2012134815 A | | 7/2012 |
| JP | 2018163326 A | | 10/2018 |

OTHER PUBLICATIONS

Machine English Translation JP 05-292367 A. Published 1993 (Year: 1993).*

* cited by examiner

*Primary Examiner* — Nelson D. Hernández Hernández
(74) *Attorney, Agent, or Firm* — Rossi, Kimms & McDowell LLP

(57) ABSTRACT

An image capturing system that makes it possible to easily attach an accessory to an image capturing apparatus body without requiring any tool. The image capturing apparatus body is provided with an accessory shoe and a screw hole. The accessory removably attached to the image capturing apparatus body includes a sheet metal that is engaged with the accessory shoe by being slidably inserted therein, and a fixing screw that has an operation portion which is rotationally operated, and is provided, in association with the screw hole, at a location frontward of the sheet metal in a direction of inserting the sheet metal into the accessory shoe. The fixing screw is screwed into the screw hole in a state in which the sheet metal is engaged with the accessory shoe, whereby the accessory is attached to the image capturing apparatus body.

28 Claims, 28 Drawing Sheets

*FIG. 25A*          *FIG. 25B*
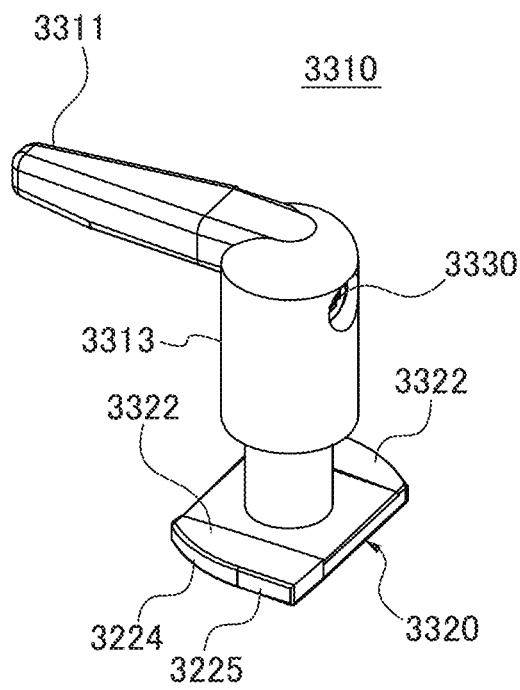
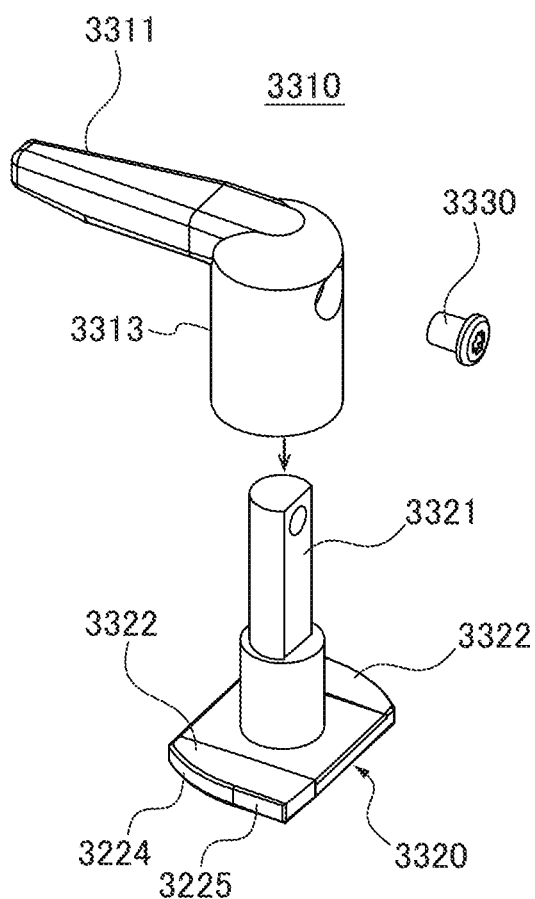

IMAGE CAPTURING SYSTEM TO WHICH ACCESSORY CAN BE EASILY ATTACHED, IMAGE CAPTURING APPARATUS, AND ACCESSORY

BACKGROUND OF THE INVENTION

Field of the Invention

The present invention relates to an image capturing system to which an accessory is removably attached, an image capturing apparatus, and an accessory.

Description of the Related Art

Image capturing apparatuses, such as video cameras, particularly large-sized image capturing apparatuses include one provided with an accessory for shooting videos and carrying the apparatus, such as a handle. Some image capturing apparatuses are configured such that an accessory can be removably attached thereto, by taking storability, maneuverability, and so forth, into consideration. For example, to an accessory shoe provided on an image capturing apparatus body, an accessory is fixed by a sliding operation or fastening with screws (see e.g. Japanese Laid-Open Patent Publication (Kokai) No. 2012-134815).

Further, an image capturing apparatus is also known in which sliding portions are not provided on an image capturing apparatus body and an accessory, but fitting portions are provided around through holes for inserting screws to be fastened and screw holes, thereby making it possible to fix the accessory to the image capturing apparatus body without looseness (see e.g. Japanese Laid-Open Patent Publication (Kokai) No. 2018-163326).

However, in Japanese Laid-Open Patent Publication (Kokai) No. 2012-134815, after slidably inserting the accessory into the accessory shoe, it is necessary to fix the accessory on front and rear sides thereof by screw fastening. Further, in Japanese Laid-Open Patent Publication (Kokai) No. 2018-163326, a tool, such as a hexagonal wrench or a screwdriver, is required to fix the accessory, and hence the user is required to carry the tool, which is inconvenient. Further, in Japanese Laid-Open Patent Publication (Kokai) No. 2012-134815 and Japanese Laid-Open Patent Publication (Kokai) No. 2018-163326, it is required to perform a screw fastening operation at two locations or more, and hence the accessory attachment operation is complicated.

SUMMARY OF THE INVENTION

The present invention provides an image capturing system that makes it possible to easily attach an accessory to an image capturing apparatus body without requiring any tool, an image capturing apparatus, and an accessory.

In a first aspect of the present invention, there is provided an image capturing system including an image capturing apparatus body that has an accessory shoe and has a screw hole formed therein, and an accessory that is removably attached to the image capturing apparatus body, wherein the accessory comprises a sheet metal that is engaged with the accessory shoe by being slidably inserted into the accessory shoe, and a fixing screw that has an operation portion which is rotationally operated, and is provided, in association with the screw hole, at a location frontward of the sheet metal in a direction of inserting the sheet metal into the accessory shoe, and wherein the fixing screw is screwed into the screw hole in a state in which the sheet metal is engaged with the accessory shoe, whereby the accessory is attached to the image capturing apparatus body.

In a second aspect of the present invention, there is provided an image capturing system including an image capturing apparatus body that has an accessory shoe and has a screw hole formed therein, and an accessory that is removably attached to the image capturing apparatus body, wherein the accessory comprises a sheet metal that has an inclined surface and can be slidably inserted into the accessory shoe, and a fixing screw that has an operation portion which is rotationally operated, and is provided, in association with the screw hole, at a location which is different from a location of the sheet metal, and wherein when the fixing screw is screwed into the screw hole in a state in which the sheet metal is inserted into the accessory shoe, the inclined surface of the sheet metal is brought into engagement with the accessory shoe by a rotational force of the fixing screw, and the fixing screw is screwed into the screw hole, whereby the accessory is attached to the image capturing apparatus body.

In a third aspect of the present invention, there is provided an image capturing system including an image capturing apparatus body that has an accessory shoe, and an accessory that is removably attached to the image capturing apparatus body, wherein the accessory shoe comprises a base portion fixed to the image capturing apparatus body, a pair of side walls that are formed to protrude from the base portion and are substantially parallel to each other, and a pair of opposed portions that are formed to extend from the pair of side walls, respectively, and are opposed to the base portion, wherein the accessory comprises an operation portion that is rotationally operated, and an engagement member that is rotated about a central axis in unison with the operation portion and is formed into a plate shape which is point-symmetrical with respect to the central axis, the engagement member including first opposed surfaces having an opposing distance therebetween which continuously changes and is longer than a width of an opening formed by the pair of opposed portions, and second opposed surfaces having an opposing distance therebetween which is shorter than the width of the opening, and wherein when the operation portion is rotationally operated in a state in which the engagement member is inserted into the accessory shoe, a frictional force is generated between the first opposed surfaces and the pair of side walls, whereby the accessory is attached to the image capturing apparatus body.

In a fourth aspect of the present invention, there is provided an image capturing system including an image capturing apparatus body that has an accessory shoe, and an accessory that is removably attached to the image capturing apparatus body, wherein the accessory shoe comprises a base portion fixed to the image capturing apparatus body, a pair of side walls that are formed to protrude from the base portion and are substantially parallel to each other, and a pair of opposed portions that are formed to extend from the pair of side walls, respectively, and are opposed to the base portion, wherein the accessory comprises an operation portion that is rotationally operated, and an engagement member that is rotated about a central axis in unison with the operation portion, the engagement member including tapered portions each having a thickness which continuously changes in a direction about the central axis, and wherein when the operation portion is rotationally operated in a state in which the engagement member is inserted into the accessory shoe, the tapered portions are sandwiched and held between the base portion and the pair of opposed portions, whereby the accessory is attached to the image capturing apparatus body.

According to the present invention, it is possible to easily attach an accessory to the image capturing apparatus body without requiring any tool.

Further features of the present invention will become apparent from the following description of exemplary embodiments (with reference to the attached drawings).

BRIEF DESCRIPTION OF THE DRAWINGS

FIG. 25A is a perspective view of a handle fixing lever.

FIG. 25B is an exploded perspective view of the handle fixing lever.

DESCRIPTION OF THE EMBODIMENTS

The present invention will now be described in detail below with reference to the accompanying drawings showing embodiments thereof.

Figure 1:
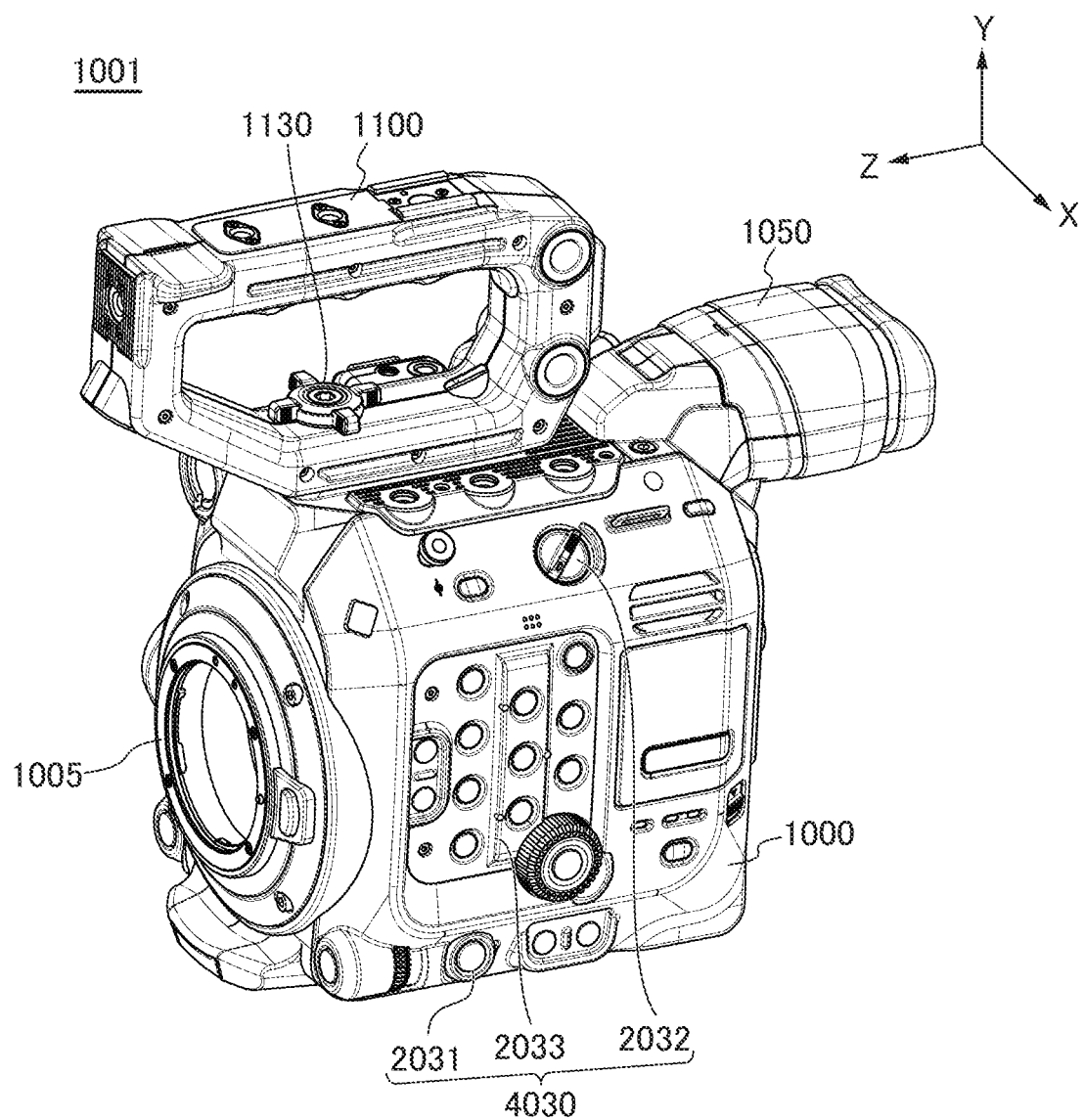
FIG. 1 is a perspective view of an image capturing system according to a first embodiment of the present invention in a state in which a handle as an accessory is attached thereto.
Figure 2:
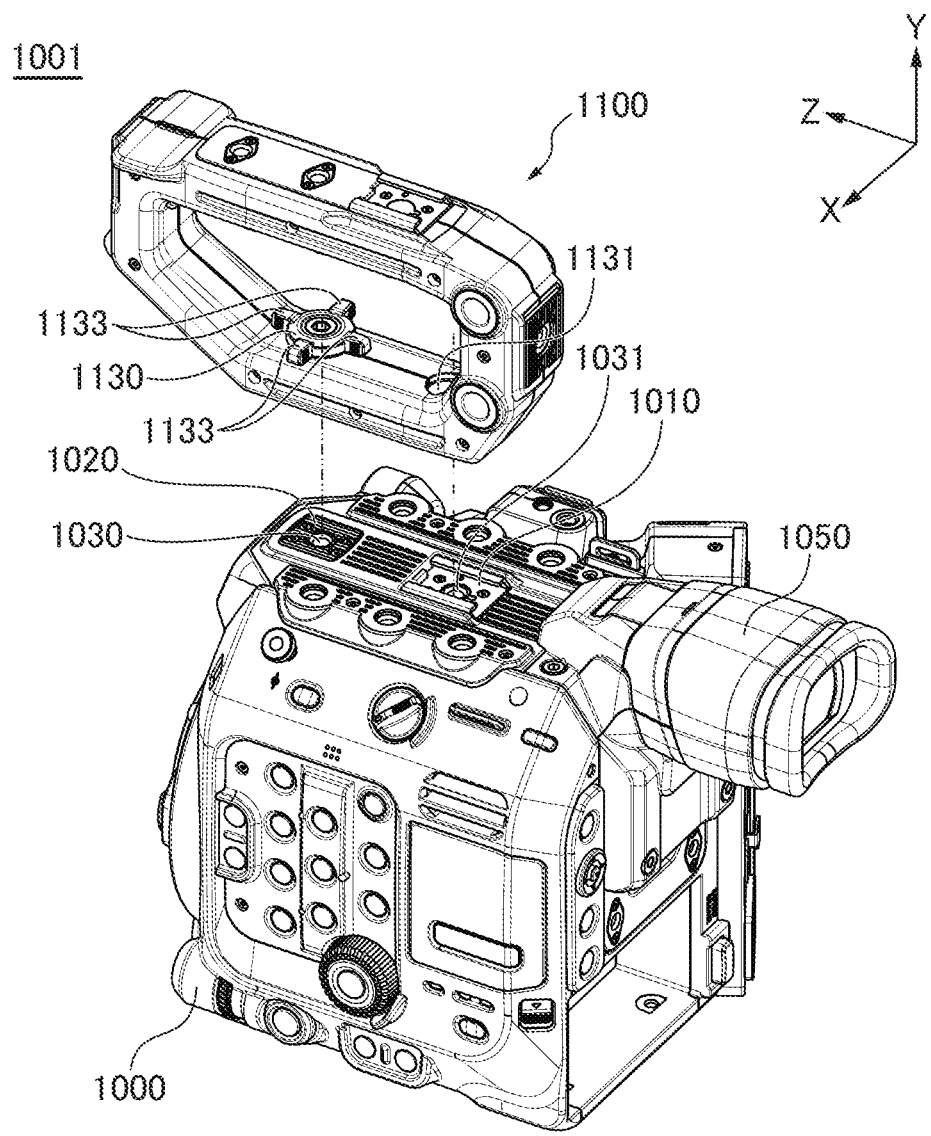
FIG. 2 is a perspective view of the image capturing system in a state in which the handle is removed therefrom.

FIGS. 1 and 2 are perspective views of an image capturing system according to a first embodiment of the present invention. This image capturing system, denoted by reference numeral 1001, includes an image capturing apparatus body 1000 and a handle 1100 as an accessory which is removably attached to the image capturing apparatus body 1000. The image capturing apparatus body 1000 is provided with a mount 1005 to which a lens unit, not shown, is interchangeably attached. Note that the image capturing apparatus body 1000 may be referred to as the image capturing apparatus. Alternatively, the image capturing system 1001 may be referred to as the image capturing apparatus. Further, a lens-integrated apparatus formed by integrating the image capturing apparatus body 1000 and a shooting lens may be referred to as the image capturing apparatus. The image capturing apparatus body 1000 is configured e.g. as a video camera capable of shooting a moving image. Hereafter, the image capturing apparatus body 1000 is abbreviatedly referred to as "the apparatus body 1000" as deemed appropriate.

Note that directions of each component of the apparatus body 1000 and the handle 1100 are referred to with reference to X, Y, and Z coordinate axes shown e.g. in FIG. 1. Here, out of directions along a shooting optical axis of the apparatus body 1000, a direction toward an object is referred to as "frontward", and a direction toward a photographer is referred to as "rearward", for convenience of explanation. Further, in FIGS. 1 and 2, for example, a +Y direction is "upward" and a +Z direction is "frontward". A +X direction as viewed from a photographer side is "leftward". Z directions are parallel to the optical axis direction.

The mount 1005 is provided on a front side of the apparatus body 1000. On a rear side of the apparatus body 1000, a viewfinder unit 1050 for checking a shot image is rotatably attached. The handle 1100 is removably attached to an upper surface of the apparatus body 1000 with a fixing screw 1130 (described in detail hereinafter). FIG. 1 shows the image capturing system 1001 in a state in which the handle 1100 is attached to the apparatus body 1000, and FIG. 2 shows the same in a state in which the handle 1100 is removed from the apparatus body 1000. The handle 1100 is an example of an accessory.

As shown in FIG. 2, the upper surface of the apparatus body 1000 is provided with a first fitting portion 1020 formed by protruding-shape portions and recessed-shape portions and an accessory shoe 1010, at respective locations spaced from each other in the Z direction. Further, the first fitting portion 1020 has a first screw hole 1030 formed substantially in the center thereof. In other words, the first fitting portion 1020 is provided around the first screw hole 1030. The accessory shoe 1010 has a second screw hole 1031 formed substantially in the center thereof, which is a screw hole different from the first screw hole 1030.

On the other hand, the handle 1100 is provided with the fixing screw 1130. The fixing screw 1130 is provided in a state retained by an O ring 1130A (see FIG. 6A) such that it is prevented from dropping off from a first screw through-hole 1129 (see FIG. 6A) having a first bearing surface 1128. The fixing screw 1130 is a fastening member to be screwed into the first screw hole 1030 and has an operation knob 1133 as an operation section for manual rotation. The operation knob 1133 is rotationally operated by a user.

On the other hand, the handle 1100 is provided with a second screw through-hole 1131 (see FIGS. 2 and 6A) at a location associated with the second screw hole 1031. The second screw through-hole 1131 is formed through the handle 1100 including a slide sheet metal 1110 (see FIG. 6A). The second screw through-hole 1131 has a second bearing surface 1132 (see FIG. 6A). A hexagonal screw (not shown) is screwed into the second screw hole 1031 through the second screw through-hole 1131 by the user, as required, whereby the handle 1100 is fastened to the apparatus body 1000 also at the location of the second screw hole 1031 so that the handle 1100 is expected to be more firmly fixed to the apparatus body 1000. Note that the handle 1100 can be sufficiently fixed to the apparatus body 1000 only by fastening the one fixing screw 1130, and fastening through the second screw through-hole 1131 and into the second screw hole 1031 is not necessarily required.

Figure 28:
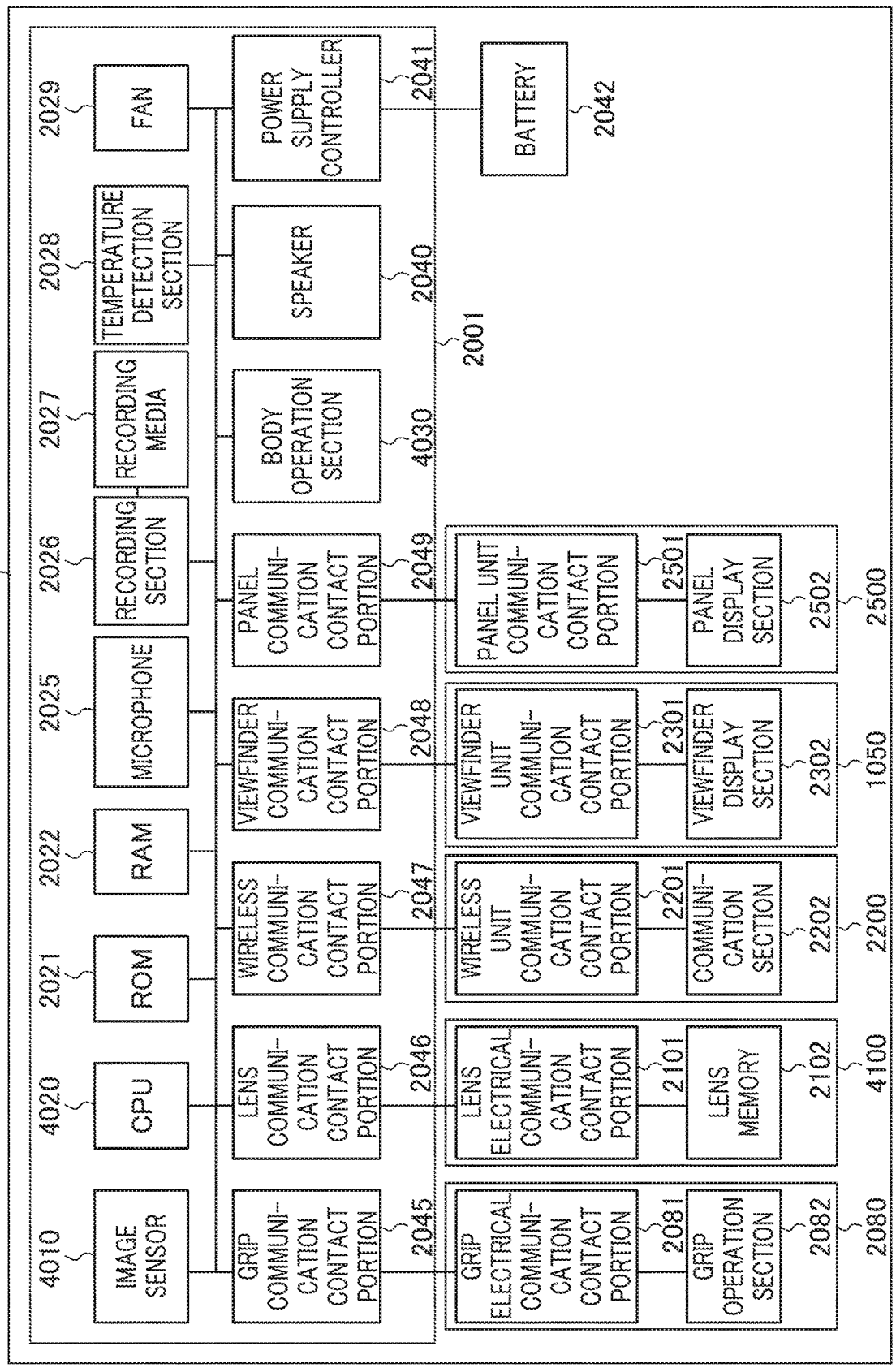
FIG. 28 is a schematic block diagram of the image capturing system.

FIG. 28 is a schematic block diagram of the image capturing system 1001. The functional configuration of the image capturing system 1001 will be described with reference to FIG. 28.

The apparatus body 1000 includes an image sensor 4010, a CPU 4020, a ROM 2021, a RAM 2022, a microphone 2025, a recording section 2026, a body operation section 4030, a speaker 2040, and a power supply controller 2041. Further, the apparatus body 1000 includes a grip communication contact portion 2045, a lens communication contact portion 2046, a wireless communication contact portion 2047, a viewfinder communication contact portion 2048, and a panel communication contact portion 2049.

A grip unit 2080 includes a grip electrical communication contact portion 2081 and a grip operation section 2082. A lens barrel 4100 includes a lens electrical communication contact portion 2101 and a lens memory 2102. A wireless unit 2200 includes a wireless unit communication contact portion 2201 and a communication section 2202. A viewfinder unit 1050 includes a viewfinder unit communication contact portion 2301 and a viewfinder display section 2302. A panel unit 2500 includes a panel unit communication contact portion 2501 and a panel display section 2502.

The image sensor 4010 is a CCD or a CMOS image sensor, and includes an analog-to-digital converter. The lens barrel 4100 causes incident light to form an optical image on the image sensor 4010, and the image sensor 4010 converts the optical image formed thereon to analog electrical signals, further converts the analog electrical signals to digital signals using the analog-to-digital converter, and outputs the digital signals as video data.

The CPU 4020, the ROM 2021, and the RAM 2022 are mounted on a main circuit board (not shown). The ROM 2021 is an electrically erasable and recordable memory, and is implemented e.g. by an EEPROM. The ROM 2021 stores constants, programs, etc. for the operation of the CPU 4020. The CPU 4020 realizes the centralized control of the apparatus body 1000 by executing the programs stored in the ROM 2021 to thereby control the operations of the components of the apparatus body 1000.

The RAM 2022 is used as a system memory, a work memory, an image memory, an audio memory, etc., and the constants, variables, and the programs read from the ROM 2021, etc., for the operation of the CPU 4020 are loaded into the RAM 2022. Audio signals input from the microphone 2025 are subjected to gain control to a predetermined level and thereafter converted from analog to digital to form digital audio data. The video data and the audio data are temporarily stored in the RAM 2022.

The CPU 4020 transmits the video data and audio data temporarily stored in the RAM 2022 to the recording section 2026. Recording media 2027 can be inserted and removed in and from the recording section 2026, and the recording section 2026 records the video data and the audio data in the recording media 2027. As the recording media 2027, removal flash memories, such as SD cards, are used.

A temperature detection section 2028 is e.g. a thermistor, and is mounted on the main circuit board (not shown). A fan 2029 is operated based on a temperature acquired by the temperature detection section 2028, and draws air into and discharges the same from the inside of the apparatus body 1000. The rotational state of the fan 2029 is controlled by the CPU 4020. The body operation section 4030 transfers an instruction input by a user's operation to the CPU 4020. The body operation section 4030 (see FIG. 1 as well) includes a body REC button 2031, a power switch 2032, and a body operation button group 2033 (see FIG. 1). An operation sound generated when the body operation section 4030 is operated, a beep generated when starting or stopping storing of a video, etc., are output from the speaker 2040 under the control of the CPU 4020.

The power supply controller 2041 is comprised of a battery detection circuit, a DC-DC converter, and a switch circuit for switching blocks to be energized, etc., and detects whether or not a battery is attached, a battery type, and a battery remaining amount. The battery, denoted by reference numeral 2042, which supplies electrical power to the apparatus body 1000 is removably attached to the apparatus body 1000 and is e.g. a lithium ion battery.

When the grip communication contact portion 2045 of the apparatus body 1000 and the grip electrical communication contact portion 2081 of the grip unit 2080 are brought into contact with each other to be electrically connected to each other, the CPU 4020 of the apparatus body 1000 detects attachment of the grip unit 2080. When the grip operation section 2082 of the grip unit 2080 is operated by a user, various instructions from the user are sent to the CPU 4020.

When the lens communication contact portion 2046 of the apparatus body 1000 and the lens electrical communication contact portion 2101 of the lens barrel 4100 are brought into contact with each other to be electrically connected to each other, the CPU 4020 of the apparatus body 1000 detects attachment of the lens barrel 4100. When attachment of the lens barrel 4100 is detected, the CPU 4020 reads lens information from the lens memory 2102 and stores the read lens information in the RAM 2022.

When the wireless communication contact portion 2047 of the apparatus body 1000 and the wireless unit communication contact portion 2201 of the wireless unit 2200 are brought into contact with each other to be electrically connected to each other, the CPU 4020 of the apparatus body 1000 detects attachment of the wireless unit 2200. When attachment of the wireless unit 2200 is detected, the CPU 4020 transmits video data and audio data stored in the RAM 2022 to the wireless unit 2200. The communication section 2202 of the wireless unit 2200 transmits the video data and audio data sent from the RAM 2022 to an external device (not shown).

When the viewfinder communication contact portion 2048 of the apparatus body 1000 and the viewfinder unit communication contact portion 2301 of the viewfinder unit 1050 are brought into contact with each other to be electrically connected to each other, the CPU 4020 of the apparatus body 1000 detects attachment of the viewfinder unit 1050. When attachment of the viewfinder unit 1050 is detected, the CPU 4020 transmits video data stored in the RAM 2022 to the viewfinder unit 1050. The viewfinder display section 2302 of the viewfinder unit 1050 is e.g. a liquid crystal display device, and displays the operating status of the apparatus body 1000, etc., as on-screen display information, on an as-needed basis.

When the panel communication contact portion 2049 of the apparatus body 1000 and the panel unit communication contact portion 2501 of the panel unit 2500 are brought into contact with each other to be electrically connected to each other, the CPU 4020 of the apparatus body 1000 detects attachment of the panel unit 2500. When attachment of the panel unit 2500 is detected, the CPU 4020 transmits video data stored in the RAM 2022 to the panel unit 2500. The panel display section 2502 of the panel unit 2500 is e.g. a liquid crystal display device, and displays the operating status of the apparatus body 1000, as on-screen display information, on an as-needed basis. Note that the information displayed on the panel display section 2502 and the viewfinder display section 2302 can be made identical or different, by configuration by the user.

In the image capturing system 1001 of the present embodiment, for example, light received by the image sensor 4010 is converted to digital image data of at least approximately 23 frames per second (fps), and the digital image data is recorded in one of the recording media 2027 by the recording section 2026. The frame rate can be set within a range from approximately 1 fps to not lower than approximately 250 fps. For example, the image capturing system 1001 may change the frame rate according to a set resolution. More specifically, a frame rate within a range from approximately 1 fps to approximately 100 fps is set in a "5K" resolution mode, a frame rate within a range from approximately 1 fps to approximately 125 fps is set in a "4K" resolution mode, and a frame rate within a range from approximately 1 fps to approximately 125 fps is set in a Quad HD mode. A frame rate within a range from approximately 1 fps to approximately 160 fps is set in a "3K" resolution mode, and a frame rate within a range from approximately 1 fps to approximately 250 fps is set in a "2K" resolution mode. For example, as the frame rate, 20, 23.976, 24, 30, 60 and 120 fps, or other frame rates between these frame rates, or frame rates not lower than these frame rates may be set.

The image capturing system 1001 can output image data at a resolution of "2K" (such as 16:9 (2048×1152 pixels) and 2:1 (2048×1024 pixels)), a resolution of "3K" (such as 16:9 (3072×1728 pixels) and 2:1 (3072×1536 pixels)), a resolution of "4K" (such as 4096×2540 pixels, 16:9 (4096×2304 pixels), and 2:1 (4096×2048 pixels)), a resolution of "4.5 k", a resolution of Quad HD (such as 3840×2160 pixels), a resolution of "5K" (such as 5120×2700 pixels), a resolution of "6K" (such as 6144×3160 pixels), a resolution of "8K" (such as 7680×4320 pixels), or a resolution higher than 8K. The image capturing system 1001 can be configured to record or output image data having a horizontal resolution at least between any values of the above-mentioned resolutions.

Further, the resolution is at least one of the above-mentioned values (or some value between the above-mentioned values), and can take approximately 6.5K, 7K, 8K, 9K, or 10K, or some value between the above-mentioned values. In the present embodiment, in information expressed in the form of xK (such as the above-mentioned 2K and 4K), the number of "x" refers to an approximate horizontal resolution. Therefore, the resolution of "4K" corresponds to the number of horizontal pixels which is approximately not smaller than 4000, and the resolution of "2K" corresponds to the number of horizontal pixels which is approximately not smaller than 2000.

The image sensor 4010 can be adapted to a size from approximately 0.5 inch (8 mm) to ⅔ inch, S35 for a movie, 35 mm full-frame for a still camera, and up to 645 (medium size). Further, the image sensor 4010 can have sizes of approximately 10.1 mm×5.35 mm, 24.4 mm×13.7 mm, 30 mm×15 mm, 36 mm×24 mm, 56 mm×42 mm, and 186 mm×56 mm. Further, the image sensor 4010 can be configured to provide a variable resolution by selectively outputting only predetermined part of the pixel area. The image sensor 4010 can include e.g. color filters arranged in the Bayer array. Therefore, the image sensor 4010 outputs data indicating an amount of red light, green light, or blue light, detected by each photoelectric conversion element of the image sensor 4010.

Figure 3A:
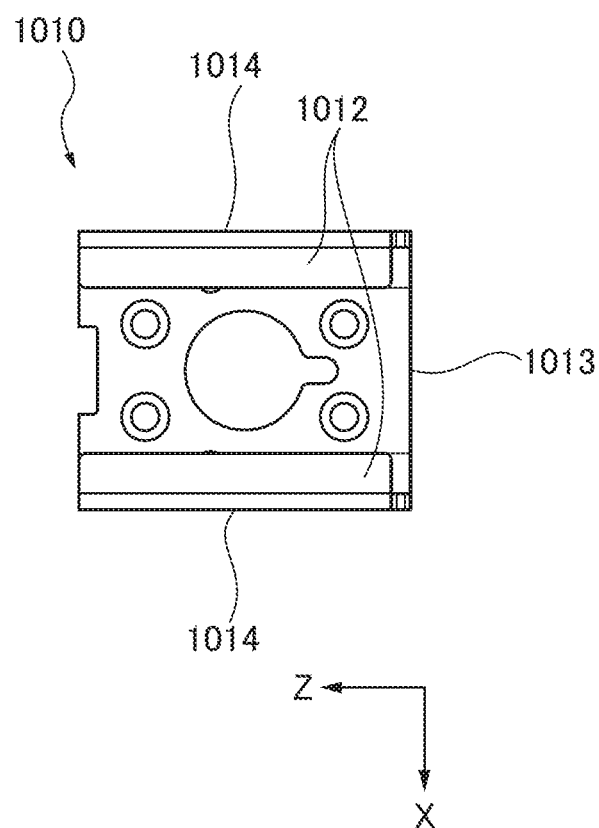
FIG. 3A is a view of an accessory shoe, as viewed from a +Y direction.
Figure 3B:
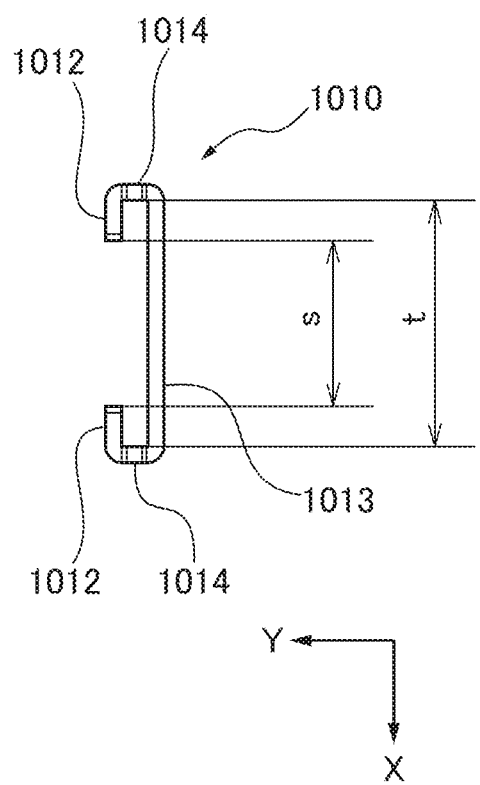
FIG. 3B is a view of the accessory shoe, as viewed from a −Z direction.

FIGS. 3A and 3B are views of the accessory shoe 1010, as viewed from the +Y direction and a −Z direction, respectively. The accessory shoe 1010 is formed by bending opposite ends of a plate-like metallic member back toward the center, into a U-shape, respectively. The accessory shoe 1010 has a base portion 1013, a pair of side walls 1014, and a pair of opposed portions 1012. The base portion 1013 is plate-shaped and substantially parallel to a surface of the apparatus body 1000, on which the accessory shoe 1010 is disposed. The X direction of the base portion 1013 is defined as a width direction. The pair of side walls 1014 as bent portions are formed at opposite ends of the base portion 1013 in the width direction such that they substantially perpendicularly protrude therefrom, respectively, and are substantially parallel to each other. The pair of opposed portions 1012 are formed to extend from the pair of side walls 1014 in respective directions opposed to each other. The pair of opposed portions 1012 are opposed to the base portion 1013 in substantially parallel to the base portion 1013. The opposed portions 1012 may be referred to as arm portions. The side walls 1014 and the opposed portions 1012 may be referred to as a pair of hook-shaped portions.

As described hereinafter, the pair of opposed portions 1012 are engaged with the slide sheet metal 1110 (see e.g. FIG. 4B). The pair of side walls 1014 are engaged with second engagement portions 1114 (see e.g. FIG. 8A) of the slide sheet metal 1110 in the width direction, respectively. As shown in FIGS. 3A and 3B, an opening is formed by the pair of opposed portions 1012. A distance s between the pair of opposed portions 1012 is an opening width. A distance t between the pair of side walls 1014 is a distance between inner surfaces of the pair of side walls 1014.

Figure 4A:
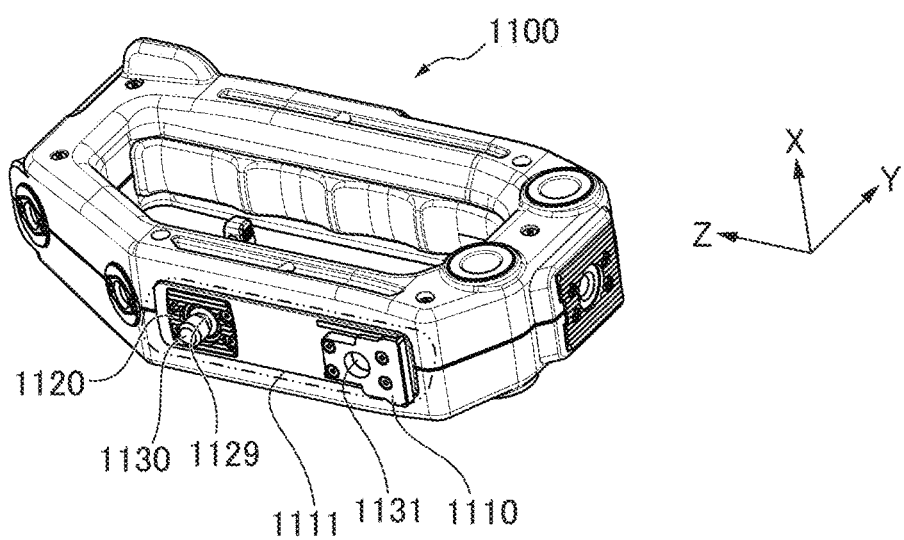
FIG. 4A is a perspective view of the handle.

FIG. 4A is a perspective view of the handle 1100. FIGS. 4B and 4C are views of the slide sheet metal 1110 and its surrounding, as viewed from a −Y direction and the +X direction, respectively.

An attachment surface 1111 of the handle 1100 is opposed to the upper surface of the apparatus body 1000 when the handle 1100 is attached to the apparts body 1000. The attachment surface 1111 is provided with a second fitting portion 1120 which is formed by protruding-shape portions and recessed-shape portions and is associated with the first fitting portion 1020 (see FIG. 2) of the apparatus body 1000. That is, the second fitting portion 1020 is provided around the fixing screw 1130. The slide sheet metal 1110 is mounted on the attachment surface 1111 at a location associated with the accessory shoe 1010.

An area of the slide sheet metal 1110 is mainly formed by the three regions of an inserted portion 1112, a first engagement portion 1113, and the second engagement portion 1114 in a mentioned order from the frontward (+Z direction) side of the handle 1100. The slide sheet metal 1110 is configured to be symmetrical with respect to a virtual line in the Z direction. As to dimensions of the slide sheet metal 1110 in the X direction, as shown in FIG. 4B, symbols k, m, and n indicate the widths of the inserted portion 1112, the first engagement portion 1113, and the second engagement portion 1114, respectively. The X direction is a direction orthogonal to a direction of inserting the slide sheet metal 1110 (+Z direction). The widths k, m, and n stepwise increase in the mentioned order from a forward side toward a rearward side in the inserting direction (k<m<n). Further, as shown in FIG. 4C, a symbol r indicates a length of the slide sheet metal 1110 in the Z direction A rearward end (end on the −Z side) of the slide sheet metal 1110 in the inserting direction is provided with vertical ribs 1115 extending from the second engagement portion 1114 toward the attachment surface 1111 of the handle 1100.

Figure 5A:
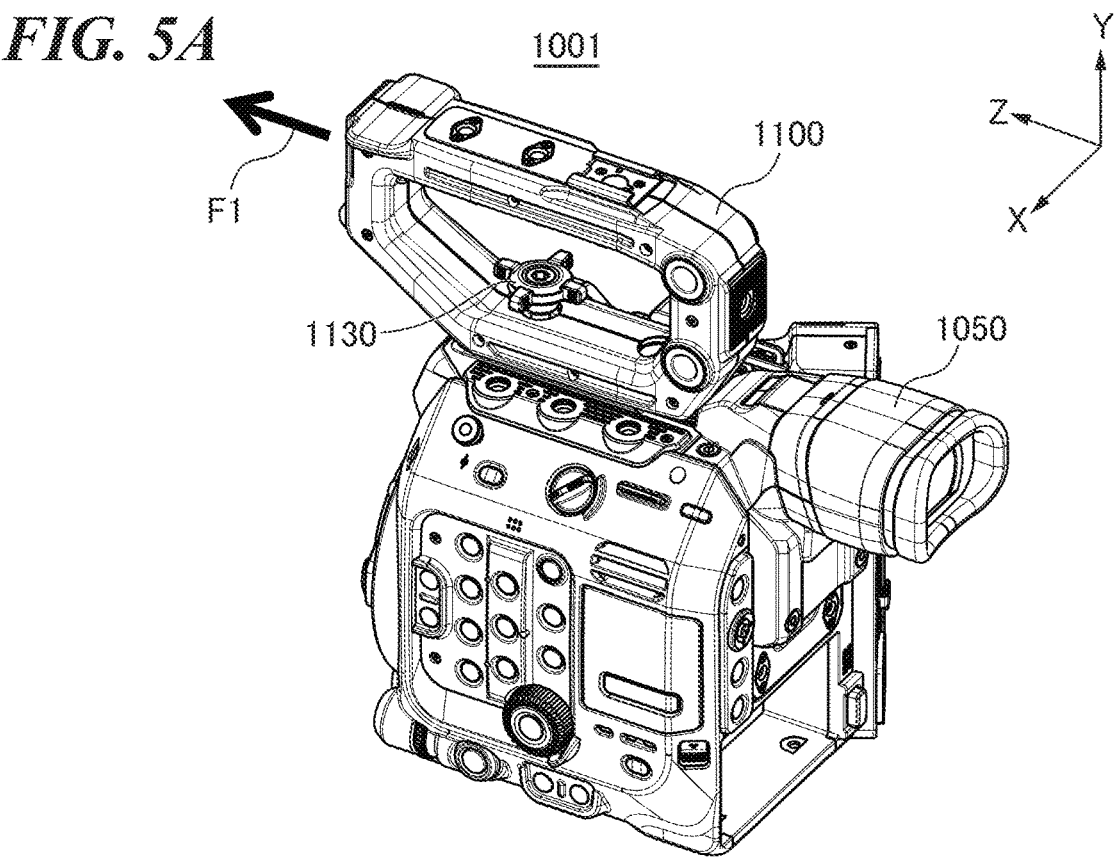
FIG. 5A is a perspective view of the image capturing system in a state in which the handle is being attached to an apparatus body.
Figure 5B:
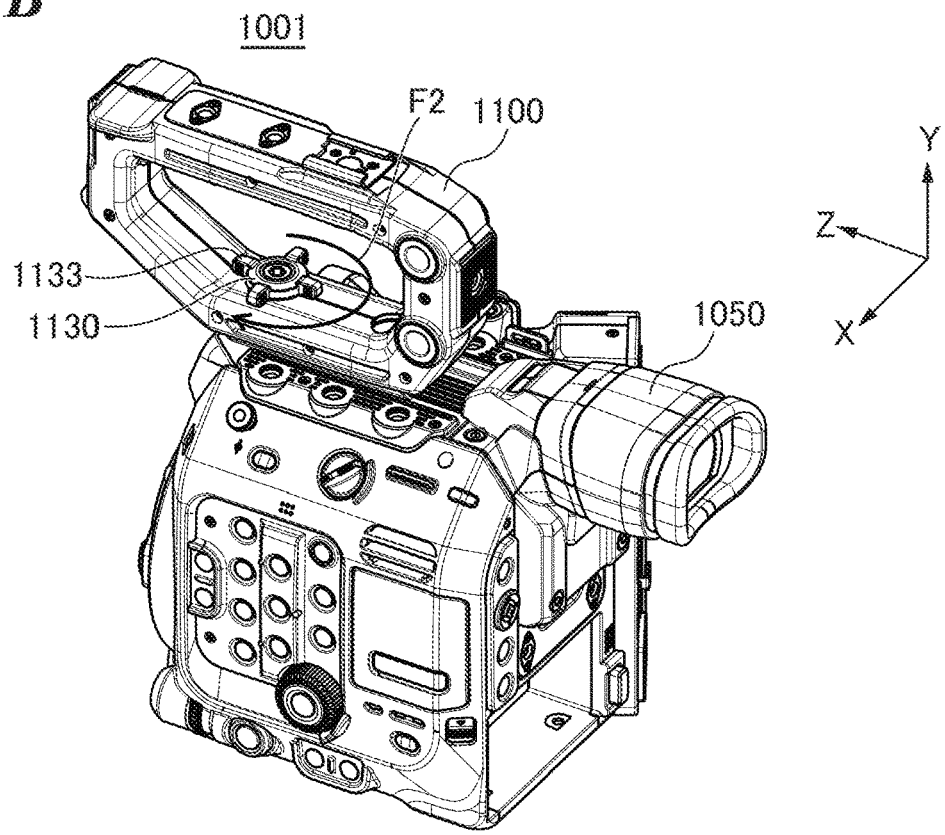
FIG. 5B is a perspective view of the image capturing system in a state in which the handle is attached to the apparatus body.

FIGS. 5A and 5B are perspective views of the image capturing system 1001. Particularly, FIGS. 5A and 5B show the image capturing system 1001 in respective states in which the handle 1100 is being attached and has been attached to the apparatus body 1000. A method of attaching the handle 1100 to the apparatus body 1000 will be described with reference to FIGS. 5A and 5B.

As shown in FIG. 5A, the user sets the handle 1100 on the upper surface of the apparatus body 1000. Then, the user slides the handle 1100 forward in the optical axis direction (direction indicated by an arrow F1; +Z direction) while inserting the slide sheet metal 1110 into the accessory shoe 1010 from the −Z direction. This causes the slide sheet metal 1110 and the accessory shoe 1010 to be engaged with each other and the first fitting portion 1020 and the second fitting portion 1120 to be lightly fitted to each other. The engagement relationship between the slide sheet metal 1110 and the accessory shoe 1010 will be further described with reference to FIGS. 6A to 8E.

Next, in a state in which the slide sheet metal 1110 is engaged with the accessory shoe 1010, the user screws, as shown in FIG. 5B, the fixing screw 1130 into the first screw hole 1030 (see FIG. 2) by rotating the operation knob 1133 in a direction indicated by an arrow F2. This causes the first fitting portion 1020 and the second fitting portion 1120 on the front side to be firmly fitted to each other, whereby the handle 1100 is fixed to the apparatus body 1000 without looseness. Since the slide sheet metal 1110 and the accessory shoe 1010 have been engaged with each other, the handle 1100 is prevented from rotating about the Z-axis and also from being loose about the X-axis.

Figure 6A:
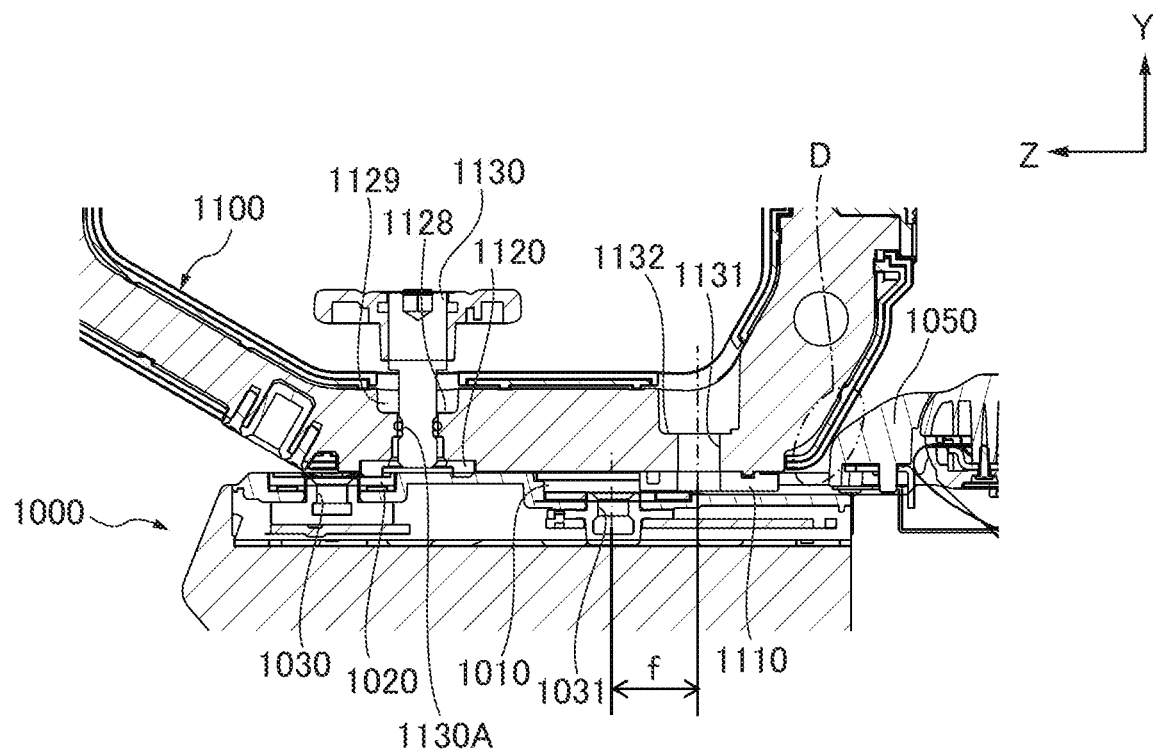
FIGS. 6A and 6B are cross-sectional views of essential parts of the slide sheet metal and the accessory shoe.
Figure 6B:
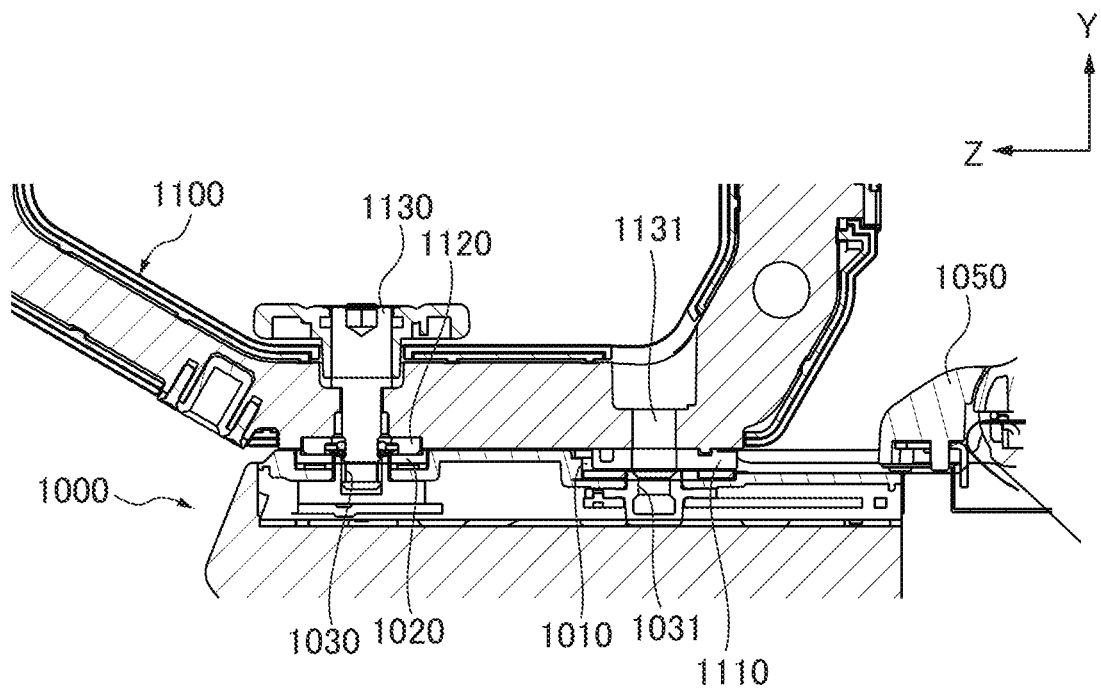
Figure 7A:
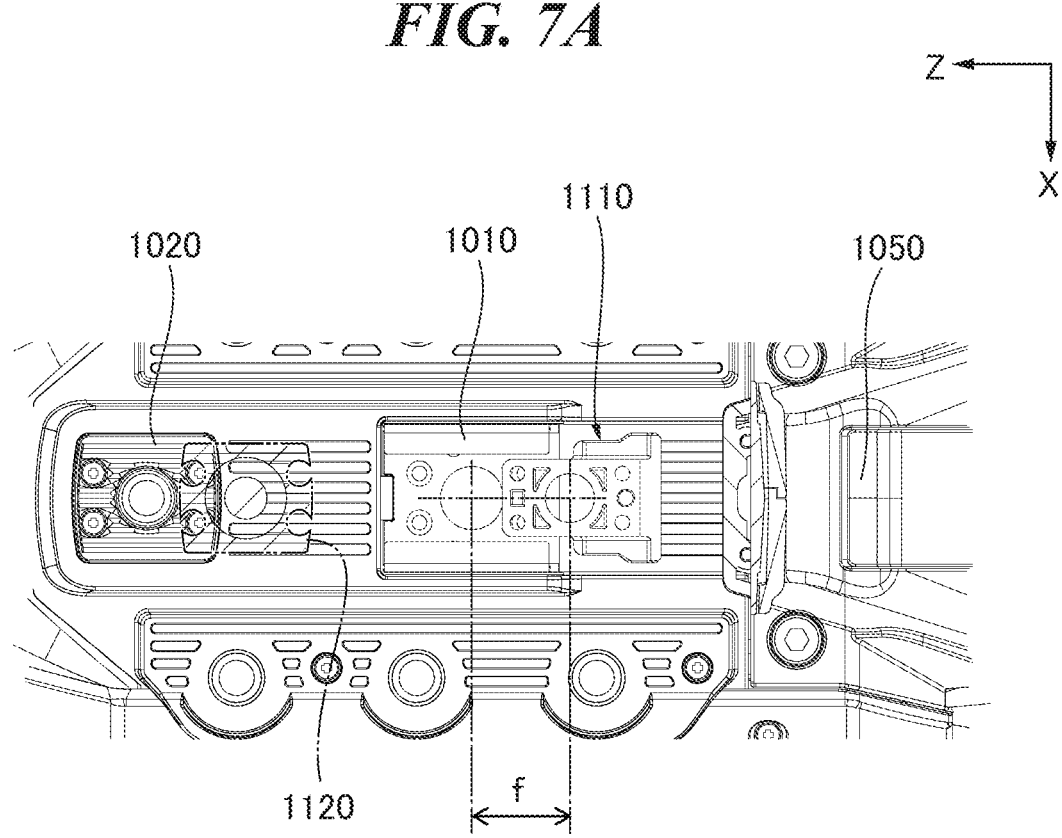
FIGS. 7A and 7B are views of the apparatus body, the slide sheet metal, and a second fitting portion, as viewed from the +Y direction.
Figure 7B:
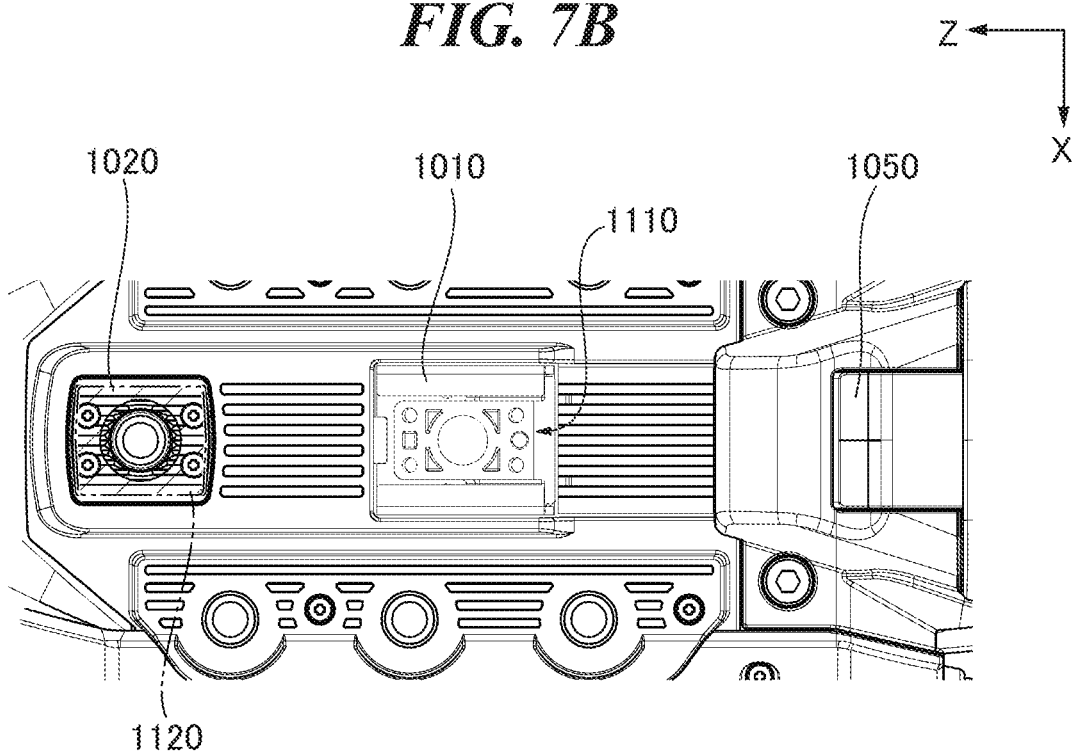

Next, the relationship between the slide sheet metal 1110 and the accessory shoe 1010 will be described with reference to FIGS. 6A to 8E. FIGS. 6A and 6B are cross-sectional views of essential parts of the slide sheet metal 1110 and the accessory shoe 1010. FIGS. 7A and 7B are views of the apparatus body 1000, as viewed from the +Y direction, to which the slide sheet metal 1110 and the second fitting portion 1120 are added for illustration. FIGS. 6A and 7A show a state before sliding the slide sheet metal 1110, which corresponds to the state shown in FIG. 5A, and FIGS. 6B and 7B show a state after sliding the slide sheet metal 1110, which corresponds to the state shown in FIG. 5B.

Figure 8A:
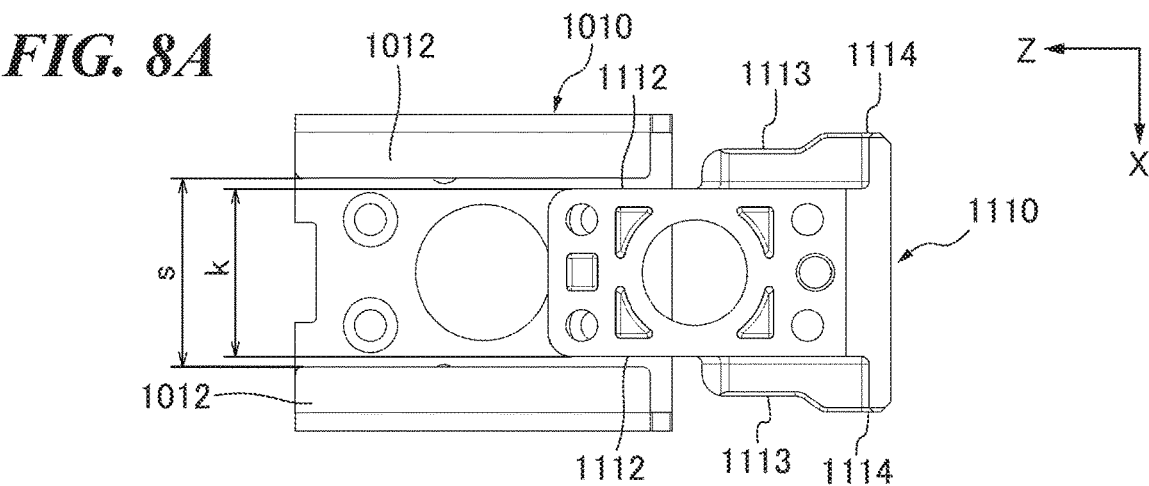
FIGS. 8A to 8E are views useful in explaining steps of a sliding process of the slide sheet metal on the accessory shoe.
Figure 8B:
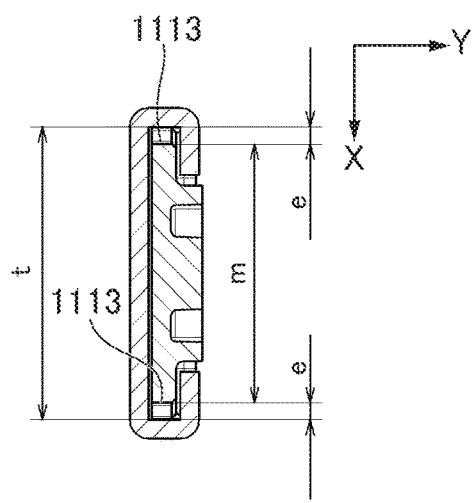
Figure 8C:
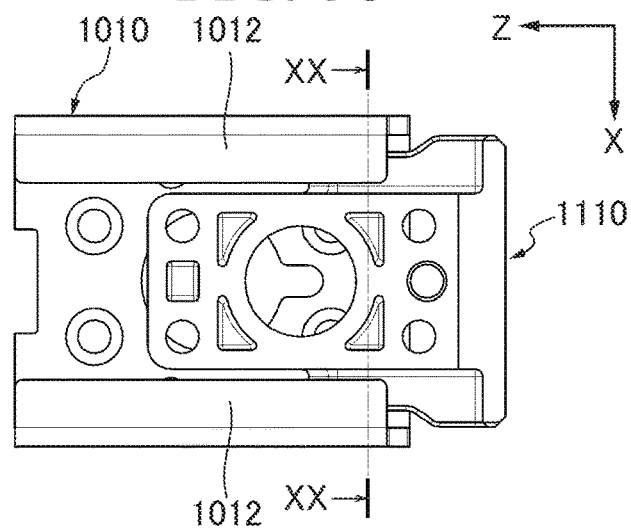
Figure 8D:
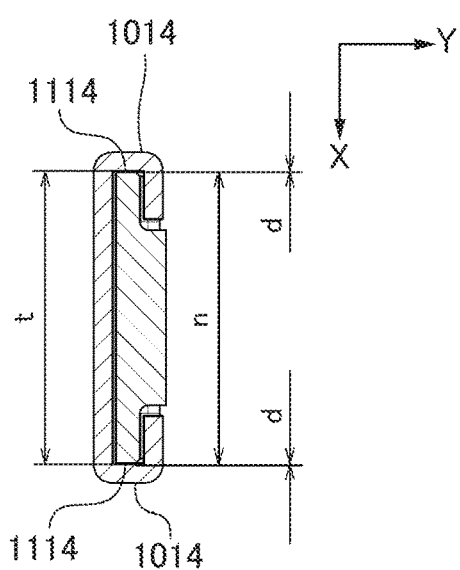
Figure 8E:
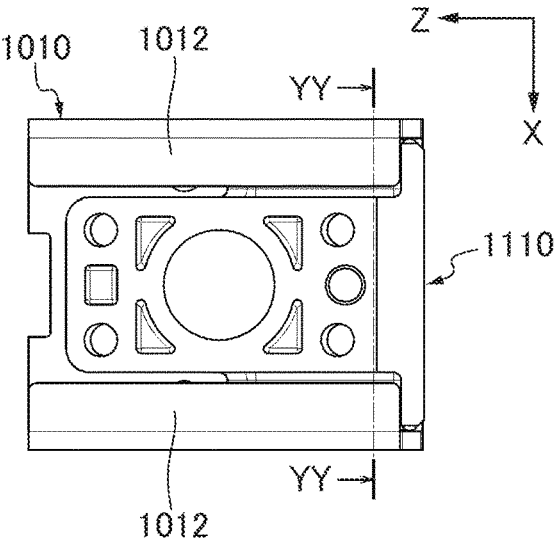

FIGS. 8A to 8E are views useful in explaining steps of a sliding process of the slide sheet metal 1100 on the accessory shoe 1010. Particularly, FIGS. 8A, 8C, and 8E are the views of the accessory shoe 1010, as viewed from the +Y direction. FIG. 8B is a cross-sectional view taken along XX-XX in FIG. 8C. FIG. 8D is a cross-sectional view taken along YY-YY in FIG. 8E. FIG. 8A corresponds to the state shown in FIG. 5A. FIGS. 8B and 8C show a state in which the slide sheet metal 1100 is being slid. FIGS. 8D and 8E correspond to the state shown in FIG. 5B.

As shown in FIG. 6A, assuming that the handle 1100 is configured such that it is largely slid when attaching the handle 1100, the viewfinder unit 1050 located in the rear of the apparatus body 1000 becomes an obstacle to the sliding operation. To avoid interference with the viewfinder unit 1050 in part D, the slidable range of the handle 1100 is limited to a slidable range f.

Figure 4B:
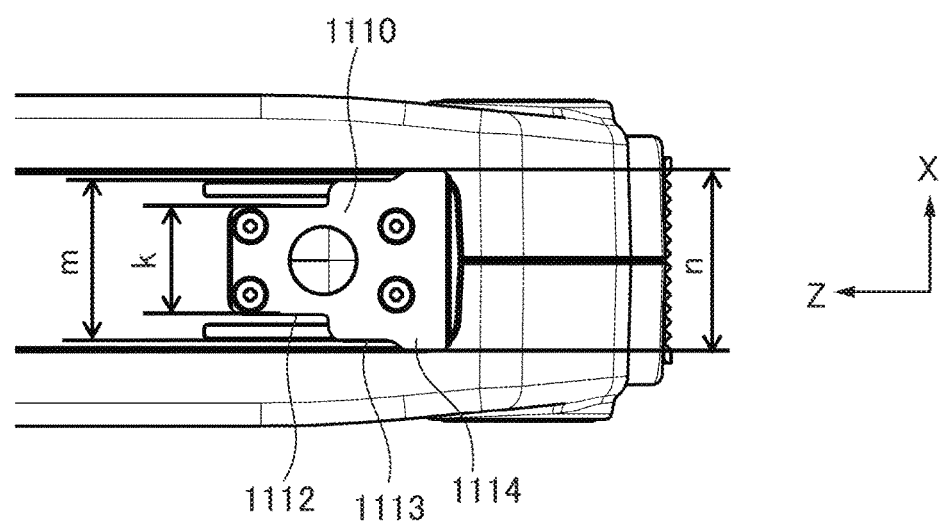
FIG. 4B is a view of a slide sheet metal and its surrounding, as viewed from a −Y direction.
Figure 4C:
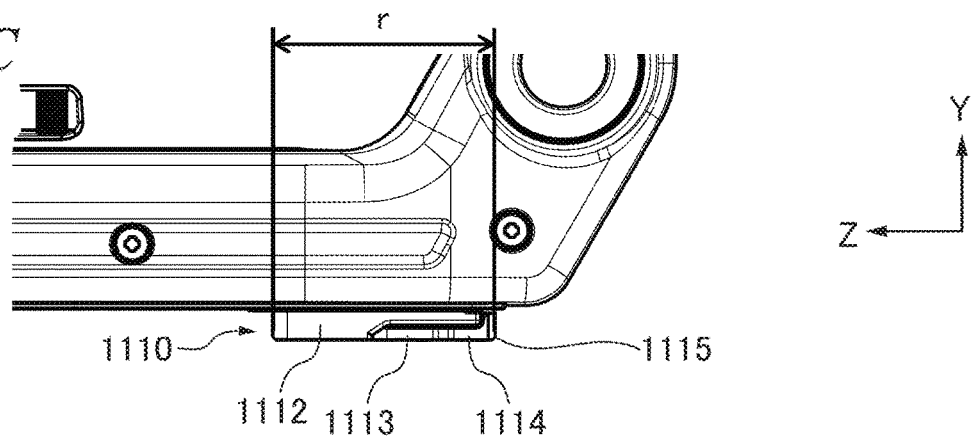
FIG. 4C is a view of the slide sheet metal and its surrounding, as viewed from a +X direction.

As mentioned above, the slide sheet metal 1110 has the widths in three steps (see FIG. 4B). A size relationship between the width k of the inserted portion 1112 and the distance s between the pair of opposed portions 1012 is s>k as shown in FIG. 8A. Therefore, when focusing only on the inserted portion 1112 having the smallest width, the slide sheet metal 1110 can be inserted between the pair of opposed portions 1012 from the +Y direction without slidably moving the slide sheet metal 1110 in the inserting direction. Therefore, even when the length r (see FIG. 4B) of the slide sheet metal 1110 in the optical axis direction is larger than the slidable range f (r>f), the user can insert the inserted portion 1112 between the pair of opposed portions 1012 without interference in the part D (see FIGS. 7A and 8A).

When the user slidably moves the handle 1100 in the +Z direction from the state shown in FIG. 7A, the first engagement portion 1113 and the second engagement portion 1114 of the slide sheet metal 1110 are brought into engagement with the pair of opposed portions 1012 in the mentioned order (see FIGS. 6B, 7B, and 8E). Further, since the first engagement portion 1113 and the second engagement portion 1114 which are different in width are provided, the width of the engagement portion increases in two steps when sliding the slide sheet metal 1110. As shown in FIGS. 8B and 8C, a clearance e is ensured between the first engagement portion 1113 and each of the pair of side walls 1014. With this, when the slide sheet metal 1110 is inserted into the accessory shoe 1010, it is possible to prevent the slide sheet metal 1110 and the accessory shoe 1010 from being caught by each other or rubbing each other, and thereby smoothly insert the first engagement portion 1113. Further, as shown in FIGS. 8D and 8E, a clearance d between the second engagement portion 1114 and each of the pair of side walls 1014 is set to a value which is smaller than the clearance e and is minimum possible. This makes it possible to effectively suppress looseness when the handle 1100 is attached to the apparatus body 1000.

When the slide sheet metal 1110 has been properly inserted in and engaged with the accessory shoe 1010, the position of the fixing screw 1130 and the position of the first screw hole 1030 coincide with each other. The user rotates the operation knob 1133 to screw the fixing screw 1130 into the first screw hole 1030, whereby attachment of the handle 1100 to the apparatus body 1000 is completed. At this time, the first fitting portion 1020 and the second fitting portion 1120 are brought into a fitted state. Thus, it is possible to fix the handle 1100 to the apparatus body 1000 without looseness by a simple operation without requiring any tool. Note that in the state in which the position of the fixing screw 1130 and the position of the first screw hole 1030 coincide with each other, the positions of the second screw through-hole 1131 and the second screw hole 1031 also coincide with each other. Therefore, to make it possible to more firmly fix the handle 1100, the user may screw the hexagonal screw (not shown) into the second screw hole 1031 through the second screw through-hole 1131.

According to the present embodiment, the apparatus body 1000 has the accessory shoe 1010 and the first screw hole 1030. The handle 1100 includes the slide sheet metal 1110 which is brought into engagement with the accessory shoe 1010 by being slidably inserted, and the fixing screw 1130 provided forward of the slide sheet metal 1110 in the direction of inserting the slide sheet metal 1110. In a state in which the slide sheet metal 1110 is engaged with the accessory shoe 1010, displacement of the handle 1100 in the X direction and the Y direction is restricted at the location of the slide sheet metal 1110. Further, when the fixing screw 1130 is screwed into the first screw hole 1030, displacement of the handle 1100 in the X direction, the Y direction, and the Z direction is restricted at the location of the fixing screw 1130. Therefore, when the fixing screw 1130 is screwed into the first screw hole 1030 in the state in which the slide sheet metal 1110 is engaged with the accessory shoe 1010, attachment of the handle 1100 to the apparatus body 1000 is completed. Therefore, it is possible to easily attach the handle 1100 to the apparatus body 1000 without requiring any tool. What is more, since the first engagement portion 1020 and the second engagement portion 1120 are brought into the fitted state, the handle 1100 is in a state even more firmly fixed to the apparatus body 1000.

Further, since the width k of the inserted portion 1112 is smaller than the distance s between the pair of opposed portions 1012, the slide sheet metal 1110 can be inserted between the pair of opposed portions 1012 from the +Y direction. With this, it is possible to avoid interference with the viewfinder unit 1050 when the slide sheet metal 1110 is inserted.

Further, since the width of the slide sheet metal 1110 is sequentially stepwise increased from the forward side in the inserting direction, it is possible to realize both of smooth insertion of the slide sheet metal 1110 and suppression of looseness after attaching the handle 1100. Note that from the viewpoint of obtaining this effect, the slide sheet metal 1110 may have widths in four or more steps.

Further, since the handle 1100 is fastened at two locations in the front and the rear, by additionally screwing the hexagonal screw into the second screw hole 1031 through the second screw through-hole 1131, it is useful for a user who desires to more firmly fix the handle 1100 to the apparatus body 1000.

Note that in a case where the effect of preventing the slide sheet metal 1110 and the accessory shoe 1010 from being caught by each other or rubbing each other when inserting the slide sheet metal 1110 into the accessory shoe 1010 is unnecessary, the slide sheet metal 1110 may have the width k and the width n in the two steps.

In a case where the handle 1100 is attached to another apparatus body including an accessory shoe, it is desirable to fix the handle 1100 to the apparatus body at two locations in the front and the rear as described above. To prevent the user from erroneously attaching the handle 1100, a measure for preventing erroneous insertion is provided in the handle 1100, as will be described with reference to FIGS. 9 and 10A to 10C.

Figure 9:
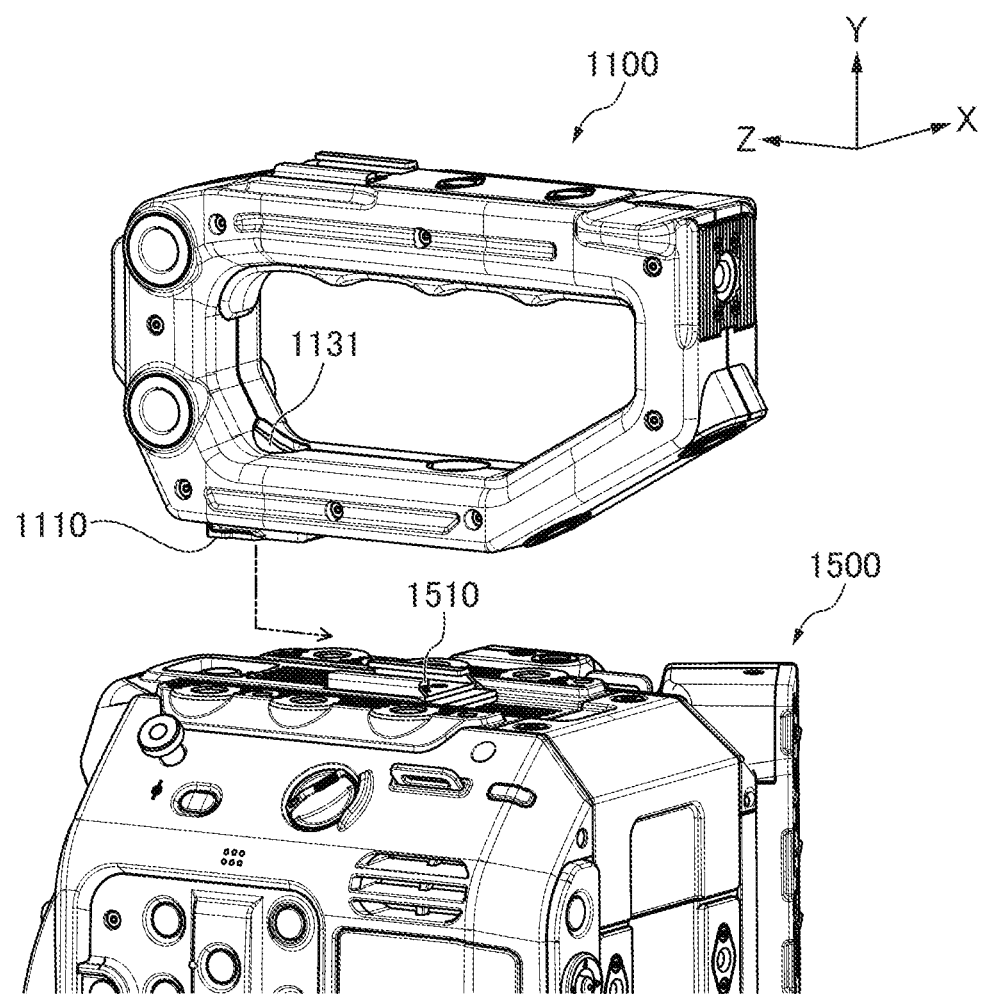
FIG. 9 is a perspective view showing how the handle is attached to another apparatus body.
Figure 10A:
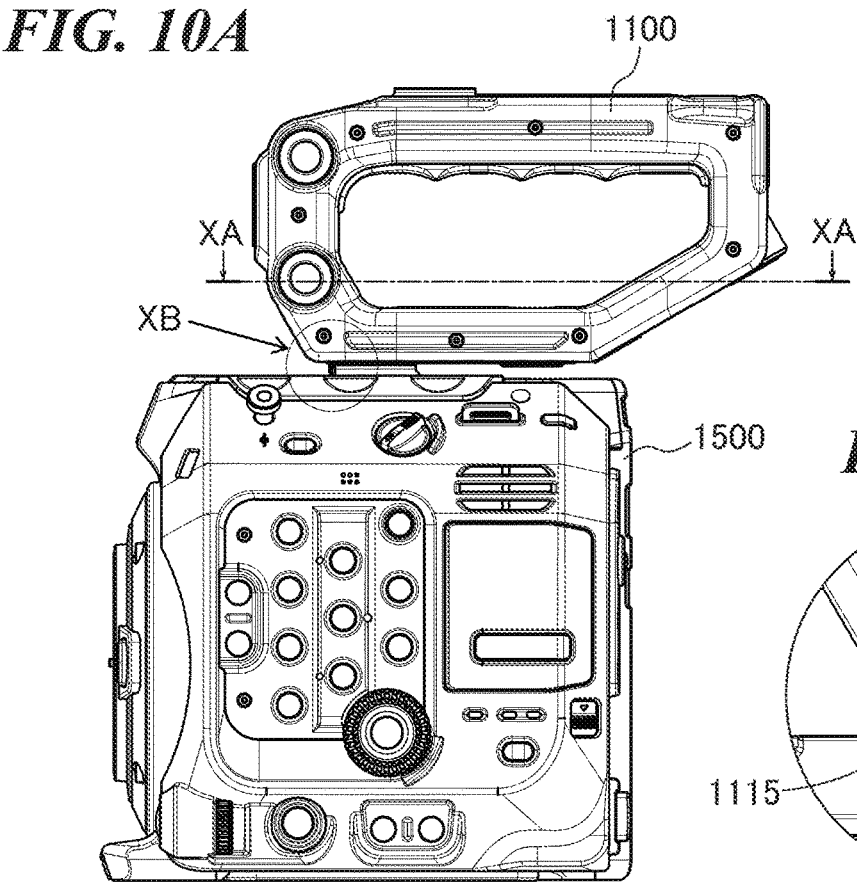
FIG. 10A is a side view of the image capturing system in a state in which the handle is being erroneously attached to the other apparatus body.
Figure 10C:
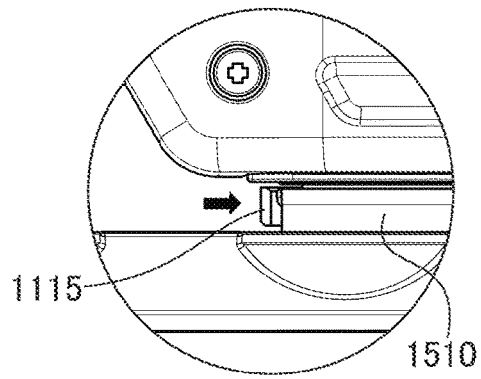
FIG. 10C is a partial enlarged view of the image capturing system in the state in which the handle is being erroneously attached to the other apparatus body.
Figure 10B:
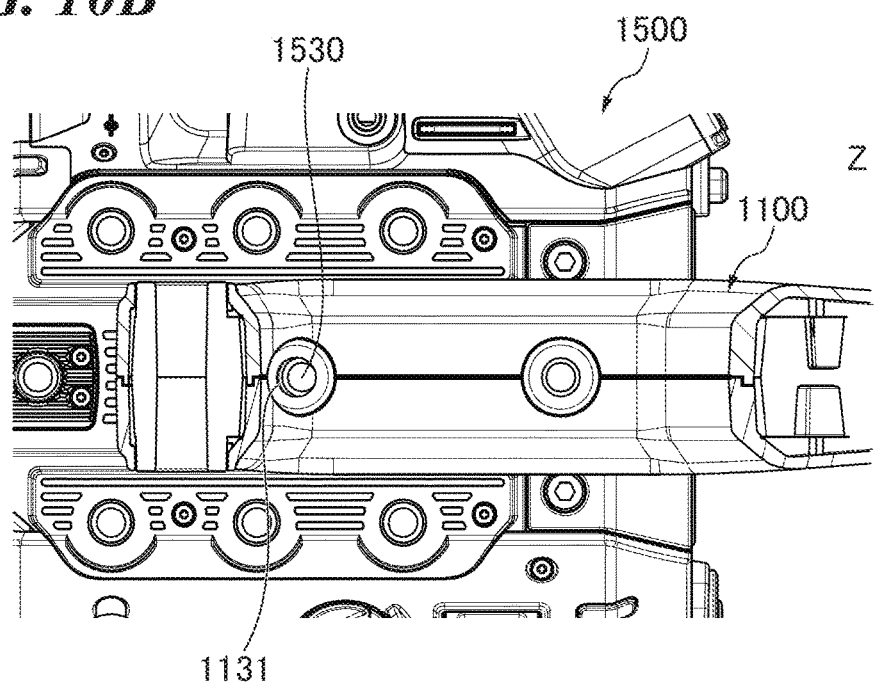
FIG. 10B is a cross-sectional view of the image capturing system in the state in which the handle is being erroneously attached to the other apparatus body.

FIG. 9 is a perspective view showing how the handle 1100 is attached to another apparatus body 1500. FIG. 10A is a side view of the image capturing system in a state in which the handle 1100 is being erroneously attached to the apparatus body. FIG. 10B is a cross-sectional view taken along XA-XA in FIG. 10A. FIG. 10C is a partial enlarged view of part XB in FIG. 10A.

For example, let us consider, a case, as shown in FIG. 9, where the slide sheet metal 1110 of the handle 1100 and an accessory shoe 1510 of the apparatus body 1500 are engaged with each other, and the handle 1100 is fixed at one location by inserting a hexagonal screw (not shown) in the second screw through-hole 1131. In the illustrated example shown in FIGS. 9 and 10A to 10C, the direction of inserting the slide sheet metal 1110 on the accessory shoe 1510 is the −Z direction opposite to the normal direction.

When a user inserts the slide sheet metal 1110 on the accessory shoe 1510 in the opposite direction, as shown in FIG. 10C, the vertical rib 1115 of the slide sheet metal 1110 is brought into abutment with an end portion (end portion on the +Z side) of the accessory shoe 1510. As a result, the slide sheet metal 1110 cannot be inserted up to the deep side (−Z direction), and hence the accessory shoe 1510 and the slide sheet metal 1110 are not correctly engaged with each other. That is, as shown in FIG. 10B, the center positions of the second screw through-hole 1131 and a first screw hole 1530 of the apparatus body 1500 do not coincide with each other. Therefore, it is impossible to fix the handle 1100 with the hexagonal screw. Thus, a situation is avoided in which the handle 1100 is fixed to the apparatus body 1500 by the erroneous fixing method.

Note that the above-described measure for preventing erroneous insertion exhibits its effect not only for the other apparatus body 1500, but also for a case where the handle 1100 is attempted to be oppositely attached to the apparatus body 1000 in the Z direction. Let it be assumed, for example, a case where under a situation in which there is no fear of interference with the viewfinder unit 1050, the slide sheet metal 1110 is slidably inserted on the accessory shoe 1510 from a direction opposite to the normal inserting direction. In this case, the position of the second screw hole 1031 and the position of the second screw through-hole 1131 are also prevented from coinciding with each other by the vertical rib 1115, and hence the handle 1100 is prevented from being attached in the opposite direction.

Figure 11:
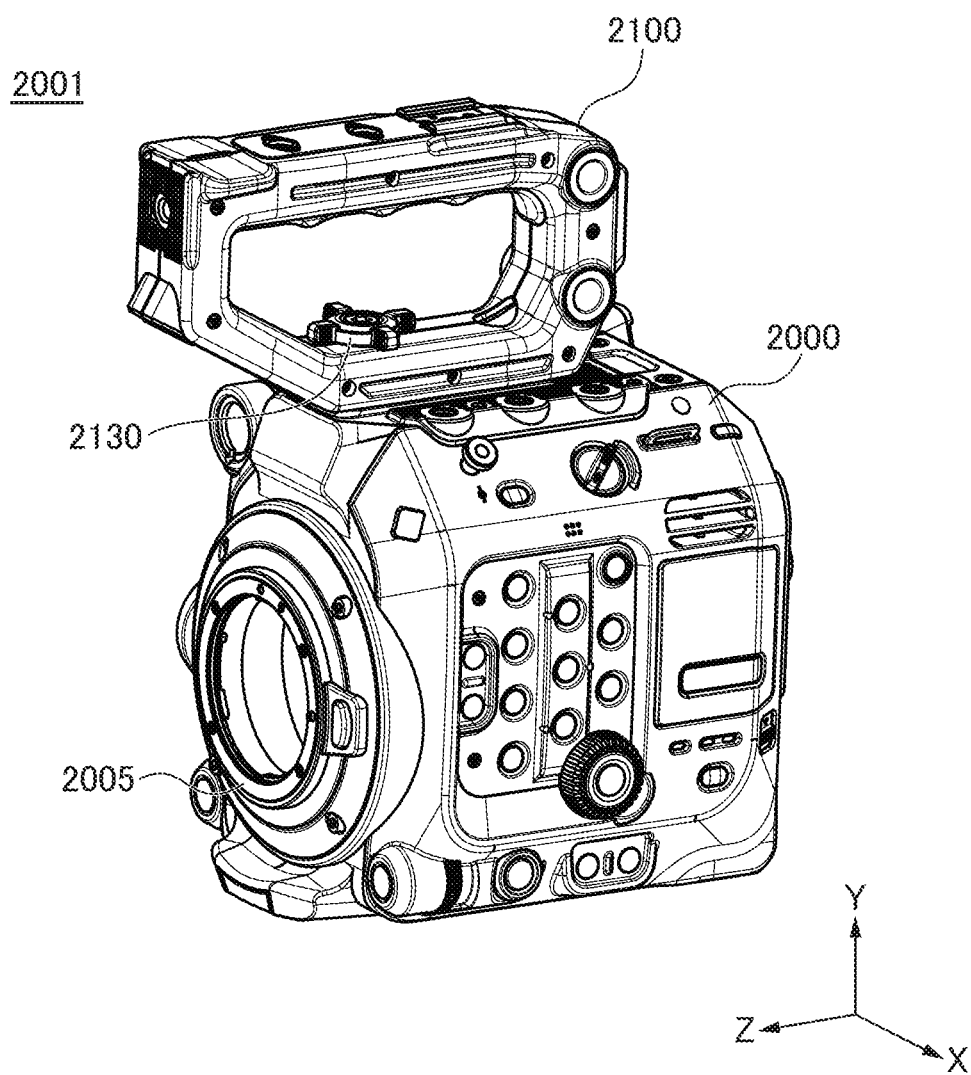
FIG. 11 is a perspective view of an image capturing system according to a second embodiment of the present invention in a state in which a handle as an accessory is attached thereto.
Figure 12:
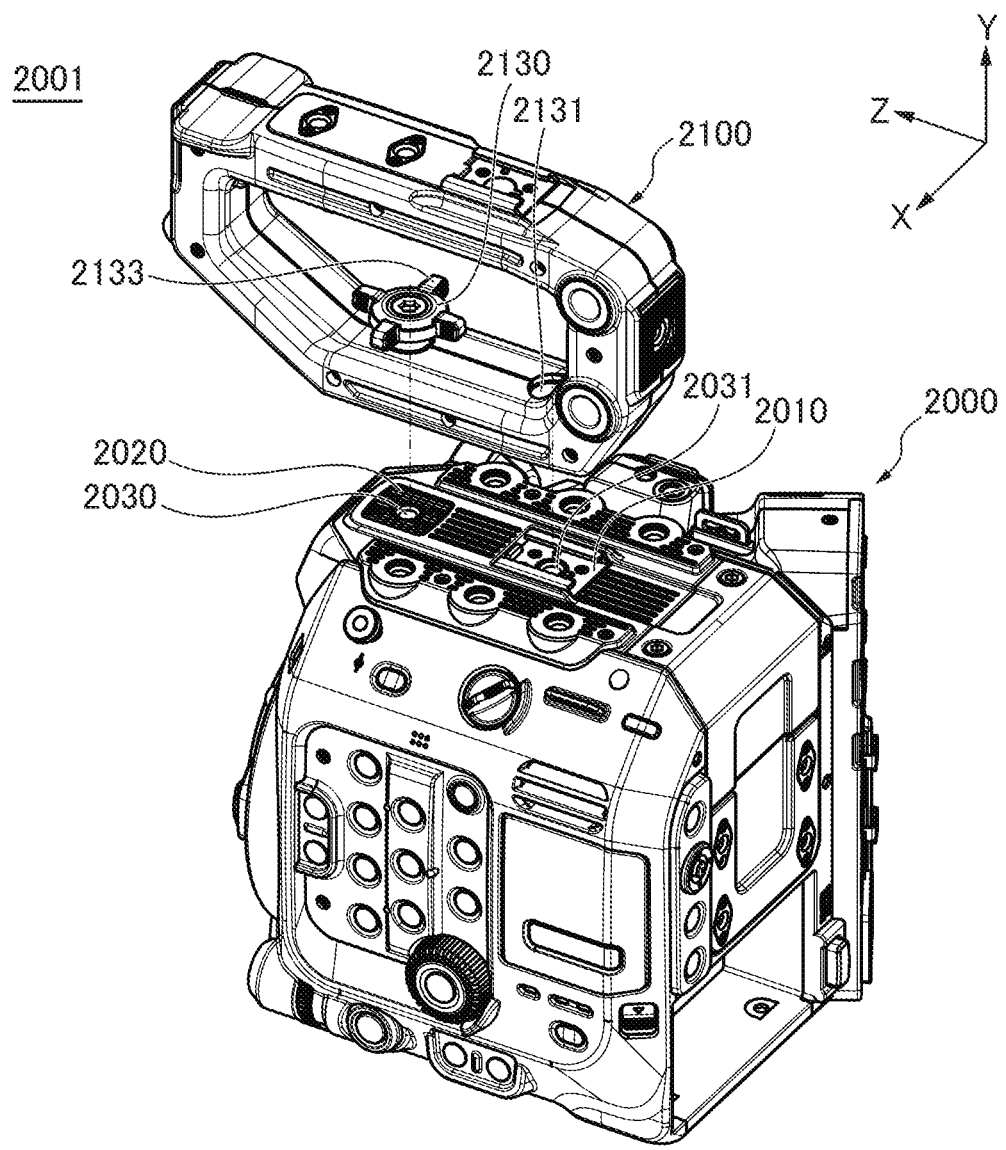
FIG. 12 is a perspective view of the image capturing system in a state in which the handle is removed therefrom.

FIGS. 11 and 12 are perspective views of an image capturing system according to a second embodiment of the present invention. This image capturing system, denoted by reference numeral 2001, differs from the image capturing system 1001 according to the first embodiment mainly in the configuration of an engagement sheet metal 2210 which corresponds to the slide sheet metal 1110. The image capturing system 2001 includes an image capturing apparatus body 2000 corresponding to the image capturing apparatus body 1000 and a handle 2100 corresponding to the handle 1100. Similar to the apparatus body 1000, the image capturing apparatus body 2000 is abbreviatedly referred to as "the apparatus body 2000" as deemed appropriate.

A fixing screw 2130, a second screw through-hole 2131, and an operation knob 2133 provided in the handle 2100 are configured similar to the fixing screw 1130, the second screw through-hole 1131, and the operation knob 1133 provided in the handle 1100, respectively. A mount 2005 and an accessory shoe 2010 provided in the apparatus body 2000 are configured similar to the mount 1005 and the accessory shoe 1010 provided in the apparatus body 1000, respectively. A first fitting portion 2020, a first screw hole 2030, and a second screw hole 2031 provided in the apparatus body 2000 are configured similar to the first fitting portion 1020, the first screw hole 1030, and the second screw hole 1031 provided in the apparatus body 1000, respectively. Note that the apparatus body 2000 may have the viewfinder unit 1050.

Figure 13A:
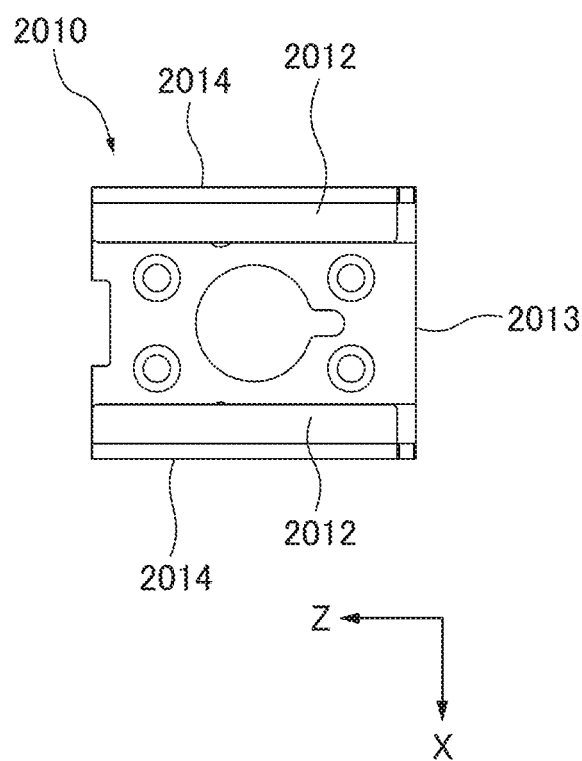
FIG. 13A is a view of an accessory shoe, as viewed from the +Y direction.
Figure 13B:
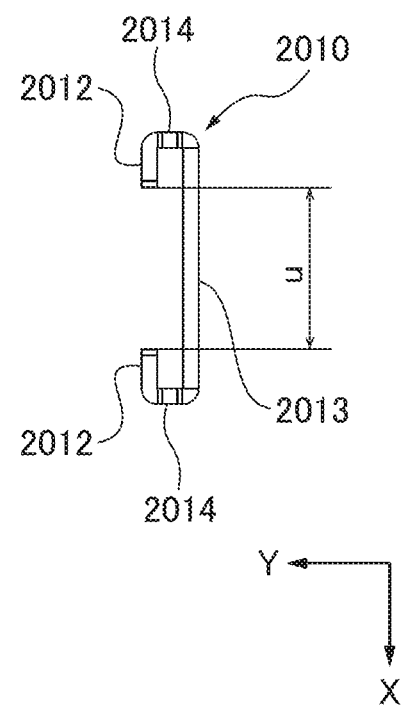
FIG. 13B is a view of the accessory shoe, as viewed from the −Z direction.

FIGS. 13A and 13B are views of the accessory shoe 2010, as viewed from the +Y direction and the −Z direction, respectively. A base portion 2013, a pair of side walls 2014, and a pair of opposed portions 2012 of the accessory shoe 2010 are configured similar to the base portion 1013, the pair of side walls 1014, and the pair of opposed portions 1012 of the accessory shoe 1010 (see FIGS. 3A and 3B), respectively. A distance u between the pair of opposed portions 2012 is the same as the distance s between the pair of opposed portions 1012 of the accessory shoe 1010.

Figure 14:
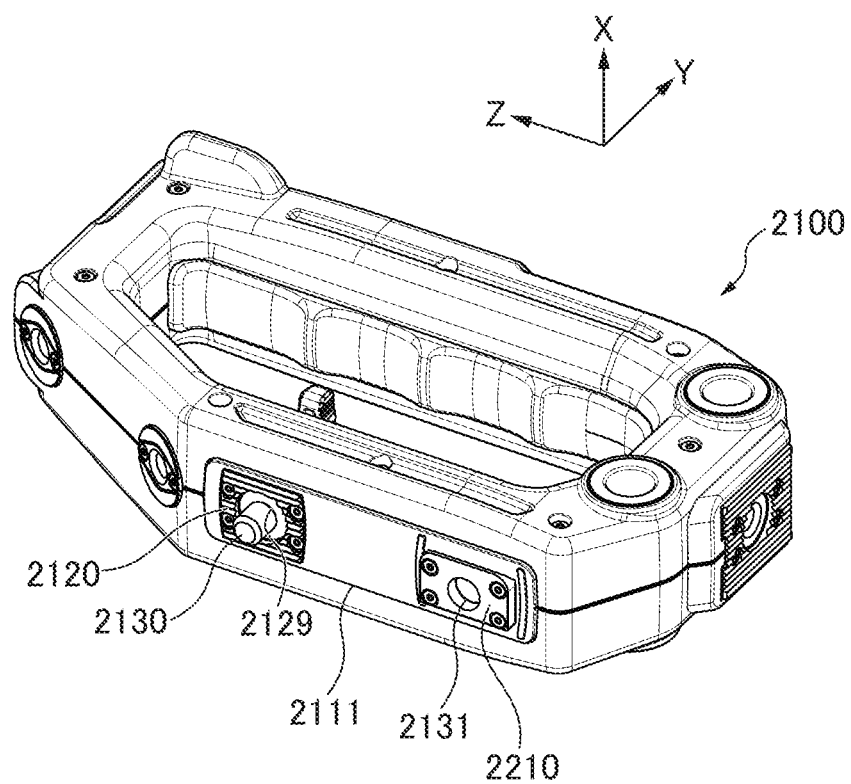
FIG. 14 is a perspective view of the handle.

FIG. 14 is a perspective view of the handle 2100. An attachment surface 2111 provided in the handle 2100 corresponds to the attachment surface 1111 (see FIG. 4) provided in the handle 1100 and is opposed to an upper surface provided in the apparatus body 2000 when the handle 2100 is attached to the apparatus body 2000. The second screw through-hole 2131, a second fitting portion 2120, and a first screw through-hole 2129 provided in the handle 2100 are configured similar to the second screw through-hole 1131, the second fitting portion 1120, and the first screw through-hole 1129 (see FIG. 4A) provided in the handle 1100, respectively. The engagement sheet metal 2210, which corresponds to the slide sheet metal 1110 (see FIG. 4A), is disposed at a location associated with the accessory shoe 2010.

Figure 15A:
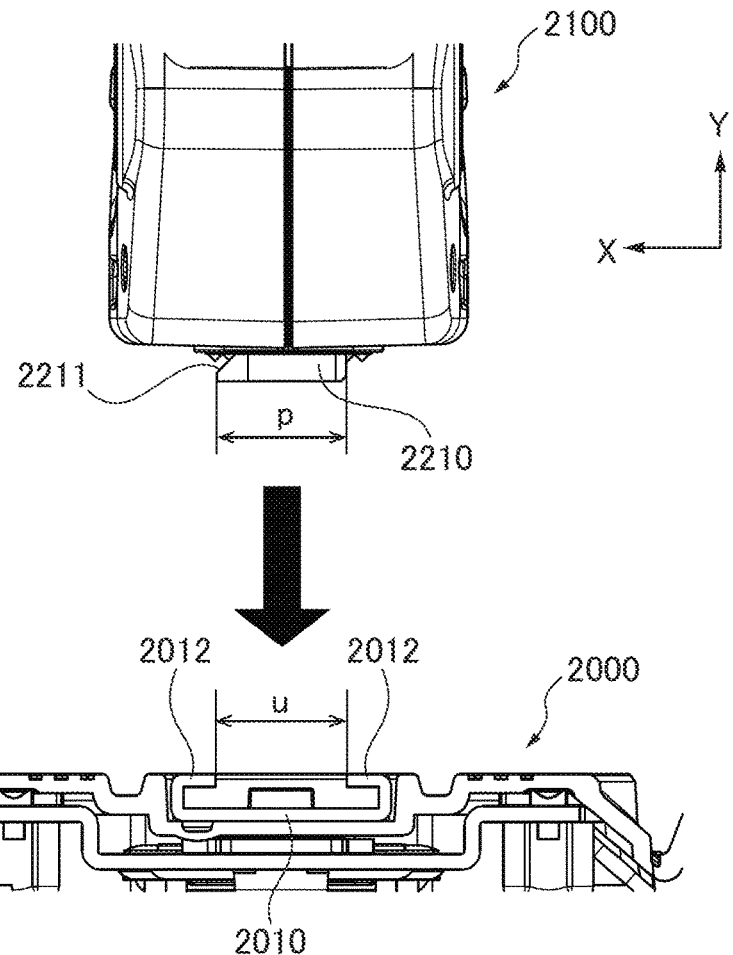
FIGS. 15A and 15B are views useful in explaining an operation of attaching the handle to an apparatus body.
Figure 15B:
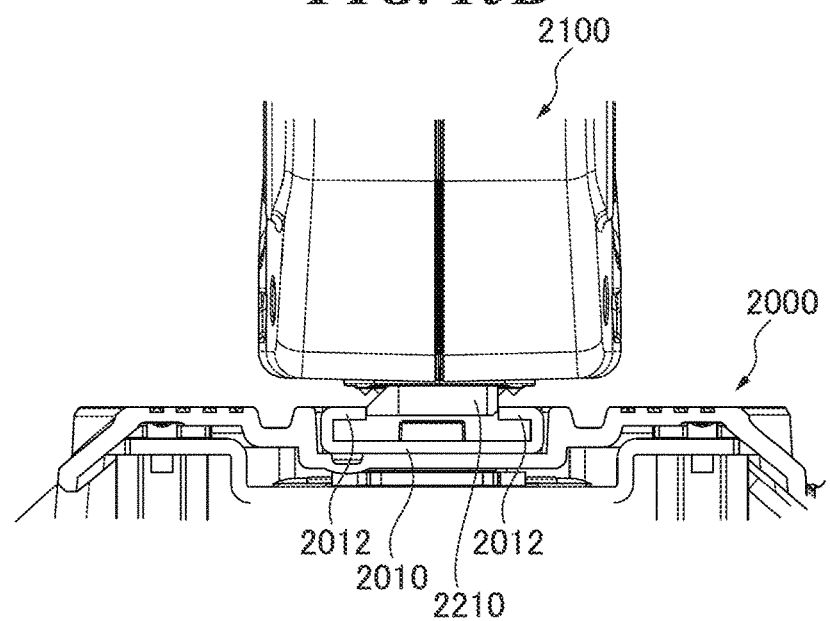
Figure 16B:
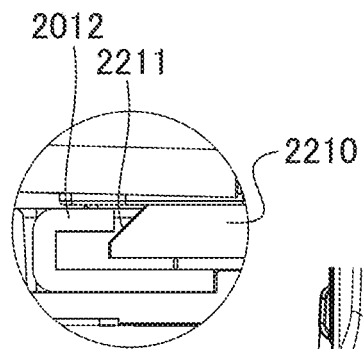
FIG. 16B is a partial enlarged view of FIG. 16A.
Figure 16A:
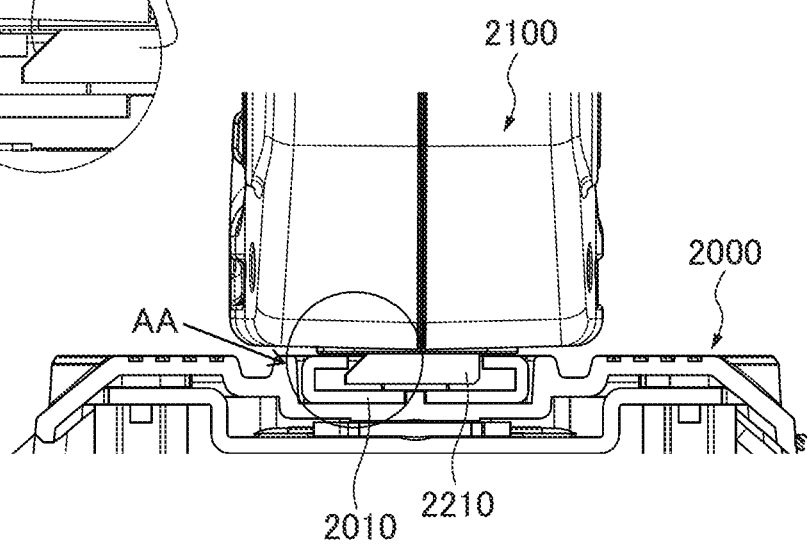
FIG. 16A is a view useful in explaining the operation of attaching the handle to the apparatus body.

Next, a method of attaching the handle 2100 to the apparatus body 2000 will be described with reference to FIGS. 15A to 17B. FIGS. 15A to 16B are views useful in explaining an operation of attaching the handle 2100 to the apparatus body 2000. FIGS. 15A, 15B, and 16A are views of the engagement sheet metal 2210 and the accessory shoe 2010, as viewed from the −Z direction. FIG. 16B is an enlarged view of part AA in FIG. 16A. Particularly, FIGS. 15A, 15B, and 16A show a state before engaging the engagement sheet metal 2210 and the accessory shoe 2010, a state in which the engagement sheet metal 2210 and the accessory shoe 2010 are being engaged with each other, and a state after the engagement sheet metal 2210 and the accessory shoe 2010 have been engaged with each other (the fixing screw 2130 has not been fastened), respectively.

As shown in FIG. 15A, a width p of the engagement sheet metal 2210 and a width u between the pair of opposed portions 2012 of the apparatus body 2000 have a relationship of p<u. Therefore, a user can insert the engagement sheet metal 2210 between the pair of opposed portions 2012 by placing down the handle 2100 from above the apparatus body 2000 (from the +Y direction) (see FIG. 15B). That is, the engagement sheet metal 2210 can be inserted from a direction opposed to the surface of the apparatus body 2000, on which the accessory shoe 2010 is disposed, and hence the user can easily perform the insertion operation. As shown in FIG. 16A, when the engagement sheet metal 2210 is placed down between the pair of opposed portions 2012, the first fitting portion 2020 (see FIG. 12) and the second fitting portion 2120 (see FIG. 14) are brought into a state in which the protruding-shape portions and recessed-shape portions of the first fitting portion 2020 are fitted to the recessed-shape portions and protruding-shape portions of the second fitting portion 2120.

Figure 17A:
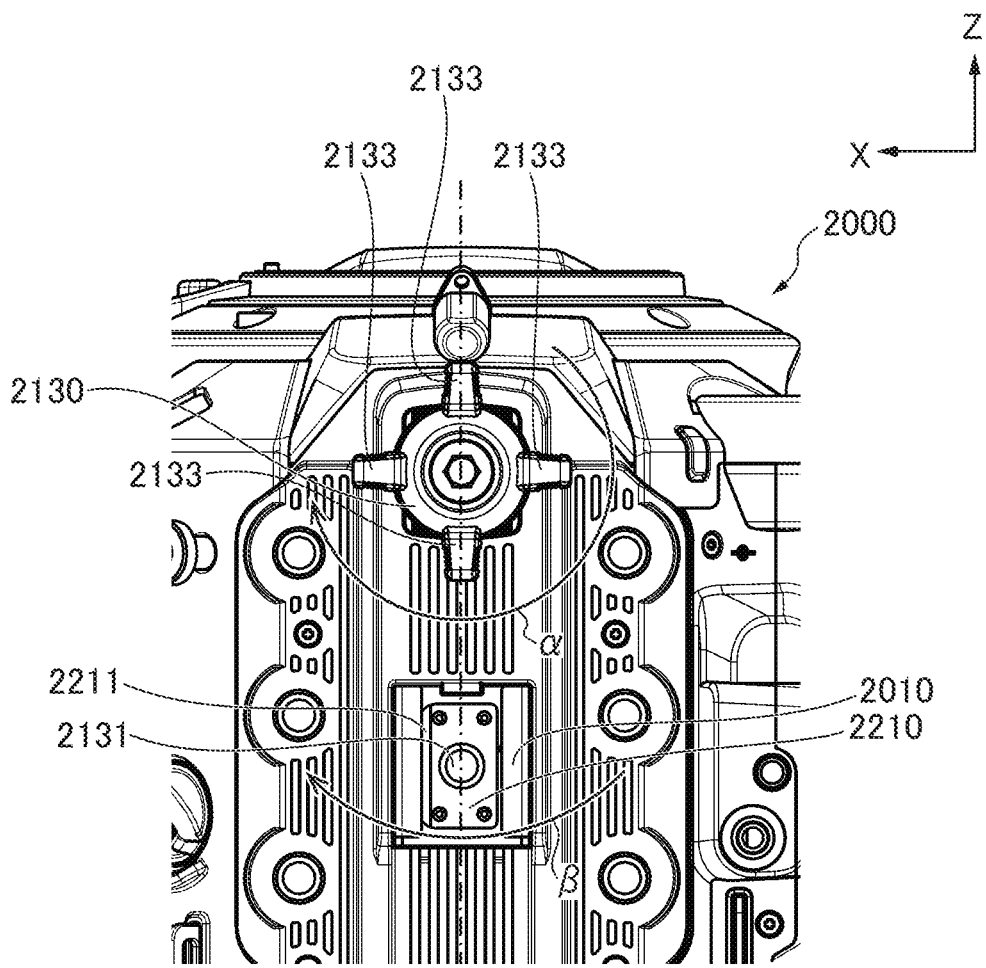
FIG. 17A is a view of the apparatus body, an engagement sheet metal, and a fixing screw, as viewed from the +Y direction.
Figure 17B:
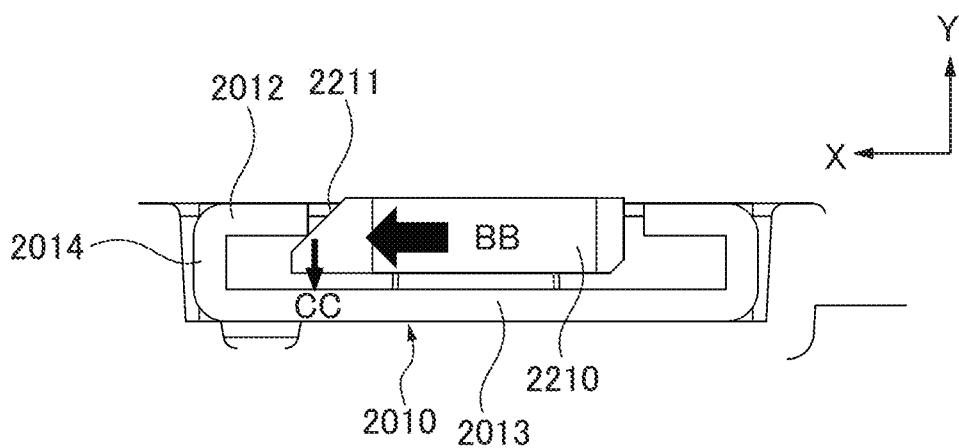
FIG. 17B is a view of where the engagement sheet metal and the accessory shoe are engaged with each other, as viewed from the −Z direction.

FIG. 17A is a view of the apparatus body 2000, as viewed from the +Y direction, to which the engagement sheet metal 2210 and the fixing screw 2130 are added for illustration. FIG. 17B is a view of where the engagement sheet metal 2210 and the accessory shoe 2010 are engaged with each other, as viewed from the −Z direction. The engagement sheet metal 2210 is formed with an engagement inclined surface 2211. Here, a fastening direction in which the fixing screw 2130 is screwed into the first screw hole 2030 (see FIG. 12) corresponds to a rotational direction α (see FIG. 17A). A rotational direction β appearing in FIG. 17A is concentric with and the same direction as the rotational direction a about the rotational axis of the fixing screw 2130. The engagement inclined surface 2211 is formed on a forward one, in the rotational direction β, of lateral ends of the engagement sheet metal 2210 in the width direction thereof. Further, the engagement inclined surface 2211 is formed on the +Y side of the engagement sheet metal 2210 in the thickness direction thereof.

In the state shown in FIGS. 16A and 16B, since the fixing screw 2130 has not been screwed into the first screw hole 2030, the engagement sheet metal 2210 has not been fixed to the accessory shoe 2010. Therefore, as shown in FIG. 16B, the engagement inclined surface 2211 and an associated one of the opposed portions 2012 (on the +X side) are not brought into contact with each other and are in a state with looseness. The user rotates the operation knob 2133 from the state shown in FIGS. 16A and 16B to rotate the fixing screw 2130 in the rotational direction α. The engagement sheet metal 2210 is also rotated about the rotational axis of the fixing screw 2130 in the rotational direction β in accordance with rotation of the fixing screw 2130. Then, the engagement sheet metal 2210 is urged in a direction indicated by an arrow BB (toward the +X side) (see FIG. 17B).

As a result, as shown in FIG. 17B, the engagement inclined surface 2211 is brought into strong contact with the associated opposed portion 2012, and the engagement sheet metal 2210 is pressed toward the base portion 2013 (toward the attachment surface 2111; in a direction indicated by an arrow CC), whereby the looseness is eliminated. That is, the engagement inclined surface 2211 is pressed toward the base portion 2013 by a hook-shaped portion (the opposed portion 2012 and the side wall 2014 on the +X side) due to a rotational force of the fixing screw 2130, generated when the fixing screw 2130 is screwed into the first screw hole 2030. This brings the engagement sheet metal 2210 into engagement with the accessory shoe 2010. Therefore, it is possible to bring the engagement sheet metal 2210 and the accessory shoe 2010 into the firmly engaged state by a simple operation of screwing the fixing screw 2130 without requiring any special operation. Note that the engagement sheet metal 2210 may be brought into contact with the base portion 2013 and a region of the engagement sheet metal 2210, having the engagement inclined surface 2211, may be sandwiched and held between the associated opposed portion 2012 and the base portion 2013 in the thickness direction.

When the fixing screw 2130 is firmly screwed into the first screw hole 2030, the engagement sheet metal 2210 is fixed to the accessory shoe 2010 without looseness. Thus, the handle 2100 is fixed to the apparatus body 2000.

According to the present embodiment, the engagement sheet metal 2210 of the handle 2100 is formed with the engagement inclined surface 2211. When the fixing screw 2130 is screwed into the first screw hole 2030 in a state in which the engagement sheet metal 2210 is inserted into the accessory shoe 2010, the engagement inclined surface 2211 is brought into engagement with the accessory shoe 2010 by the rotational force of the fixing screw 2130. When the fixing screw 2130 is screwed into the first screw hole 2030, attachment of the handle 2100 to the apparatus body 2000 is completed. Therefore, it is possible to easily attach the handle 2100 to the apparatus body 2000 without requiring any tool. What is more, since the first fitting portion 2020 and the second fitting portion 2120 are brought into the fitted state, the handle 2100 is in a state firmly fixed to the apparatus body 2000.

Further, since the handle 2100 is fastened at two locations in the front and the rear, by additionally screwing the hexagonal screw into the second screw hole 2031 through the second screw through-hole 2131, it is useful for a user who desires to more firmly fix the handle 2100 to the apparatus body 2000. However, in fixing the handle 2100 to the apparatus body 2000, the handle 2100 can be sufficiently fixed to the apparatus body 2000 only by fastening the one fixing screw 2130, and fastening through the second screw through-hole 2131 and into the second screw hole 2031 is not necessarily required.

Figure 18:
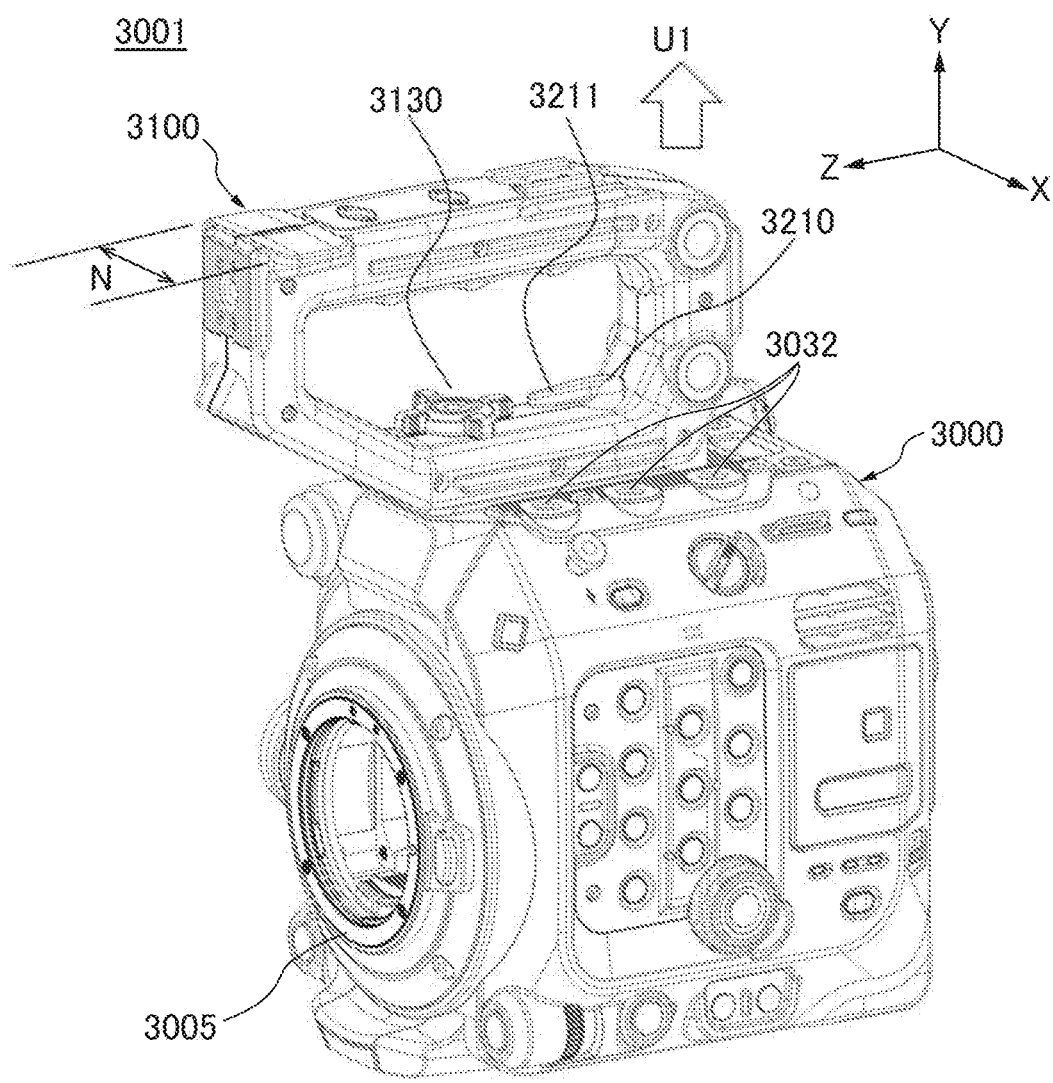
FIG. 18 is a perspective view of an image capturing system according to a third embodiment of the present invention in a state in which a handle as an accessory is attached thereto.
Figure 19:
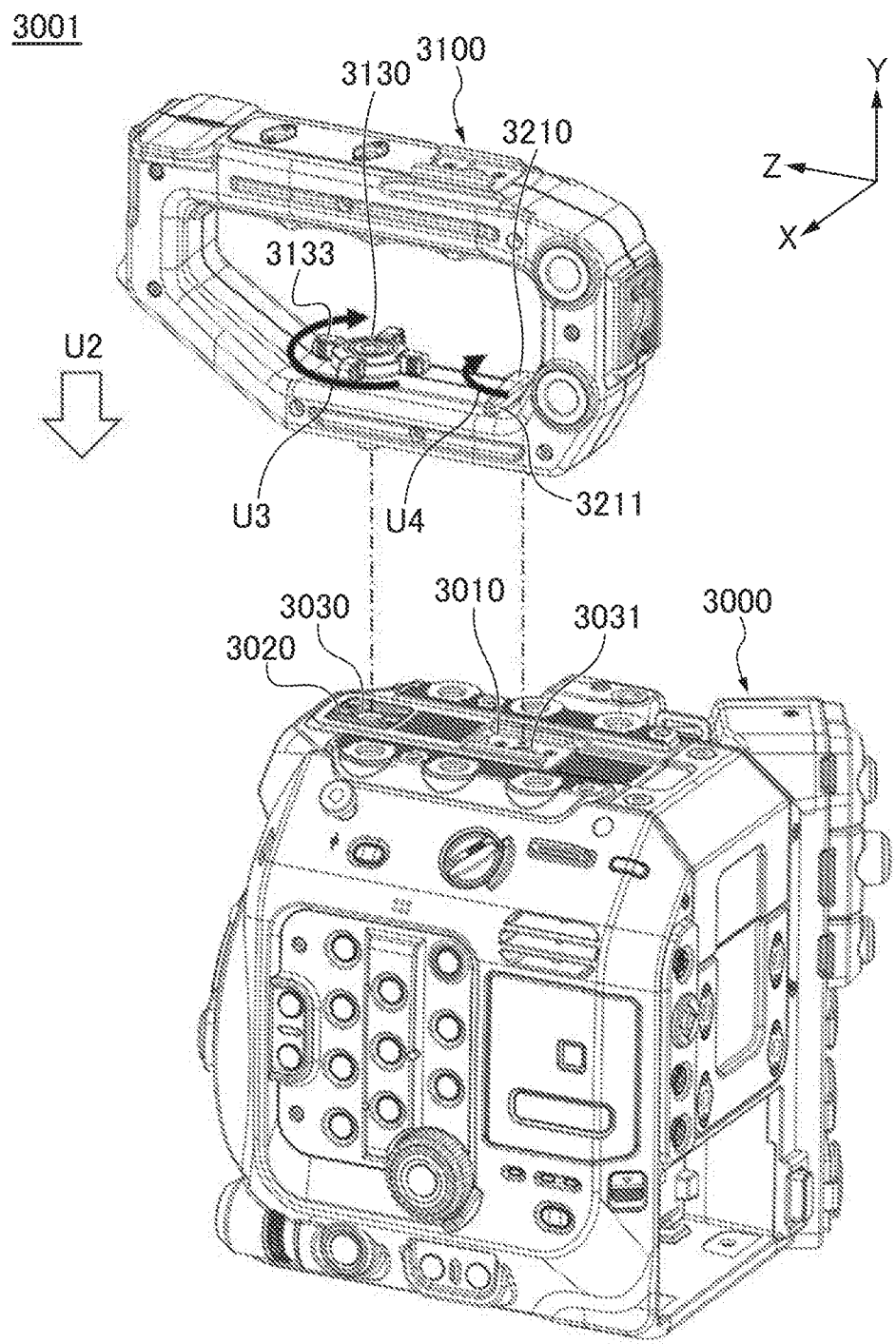
FIG. 19 is a perspective view of the image capturing system in a state in which the handle is removed therefrom.

FIGS. 18 and 19 are perspective views of an image capturing system according to a third embodiment of the present invention. This image capturing system, denoted by reference numeral 3001, includes an image capturing apparatus body 3000 and a handle 3100 as an accessory which is removably attached to the apparatus body 3000. Similar to the apparatus body 1000, the image capturing apparatus body 3000 is abbreviatedly referred to as "the apparatus body 3000" as deemed appropriate. The present embodiment differs from the first embodiment mainly in that the handle 3100 includes a handle fixing lever 3210 as an operation section which is rotationally operated. FIG. 19 shows a non-attachment state in which the handle 3100 is removed from the apparatus body 3000.

Compared with the first embodiment, a fixing screw 3130 and an operation knob 3133 provided in the handle 3100 are configured similar to the fixing screw 1130 and the operation knob 1133 provided in the handle 1100, respectively. A second screw through-hole 3131 (see FIG. 21B) provided in the handle 3100 is configured similar to the second screw through-hole 1131 provided in the handle 1100. A mount 3005 and an accessory shoe 3010 provided in the apparatus body 3000 are configured similar to the mount 1005 and the accessory shoe 1010 provided in the apparatus body 1000, respectively. A first fitting portion 3020, a first screw hole 3030, and a second screw hole 3031 provided in the apparatus body 3000 are configured similar to the first fitting portion 1020, the first screw hole 1030, and the second screw hole 1031 provided in the apparatus body 1000, respectively. Note that the apparatus body 3000 may have the viewfinder unit 1050.

The handle 3100 includes the handle fixing lever 3210. In the first embodiment, the handle 1100 is fixed to the apparatus body 1000 by the fixing screw 1130. In the present embodiment, the handle 3100 is fixed to the apparatus body 3000 by operating the handle fixing lever 3210.

Figure 20A:
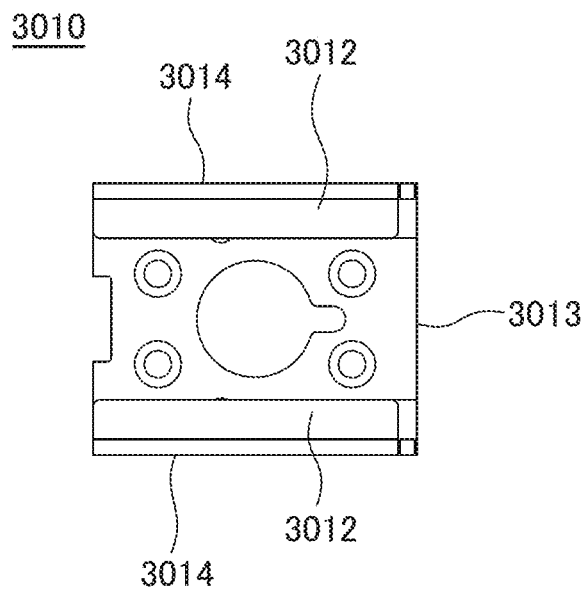
FIG. 20A is a view of an accessory shoe, as viewed from the +Y direction.
Figure 20B:
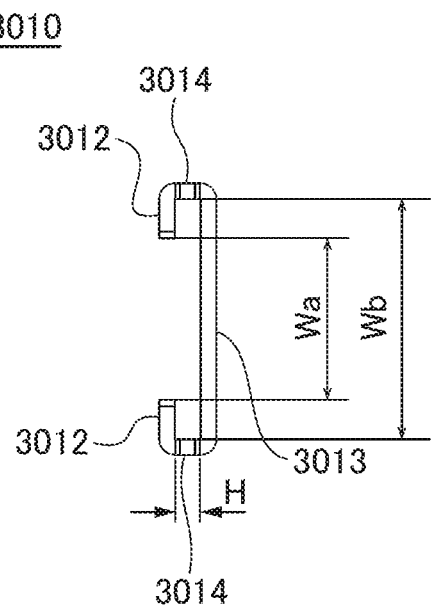
FIG. 20B is a view of the accessory shoe, as viewed from the −Z direction.

FIGS. 20A and 20B are views of the accessory shoe 3010, as viewed from the +Y direction and the −Z direction, respectively. A base portion 3013, a pair of side walls 3014, and a pair of opposed portions 3012 of the accessory shoe 3010 are configured similar to the base portion 1013, the pair of side walls 1014, and the pair of opposed portions 1012 of the accessory shoe 1010 (see FIGS. 3A and 3B), respectively. A distance Wa between the pair of opposed portions 3012 is the same as the distance s between the pair of opposed portions 1012 of the accessory shoe 1010. A symbol H indicates a distance between the base portion 3013 and each opposed portion 3012. A distance Wb between the pair of side walls 3014 is the same as the distance t between the pair of side walls 1014 (see FIGS. 3A and 3B).

Figure 21A:
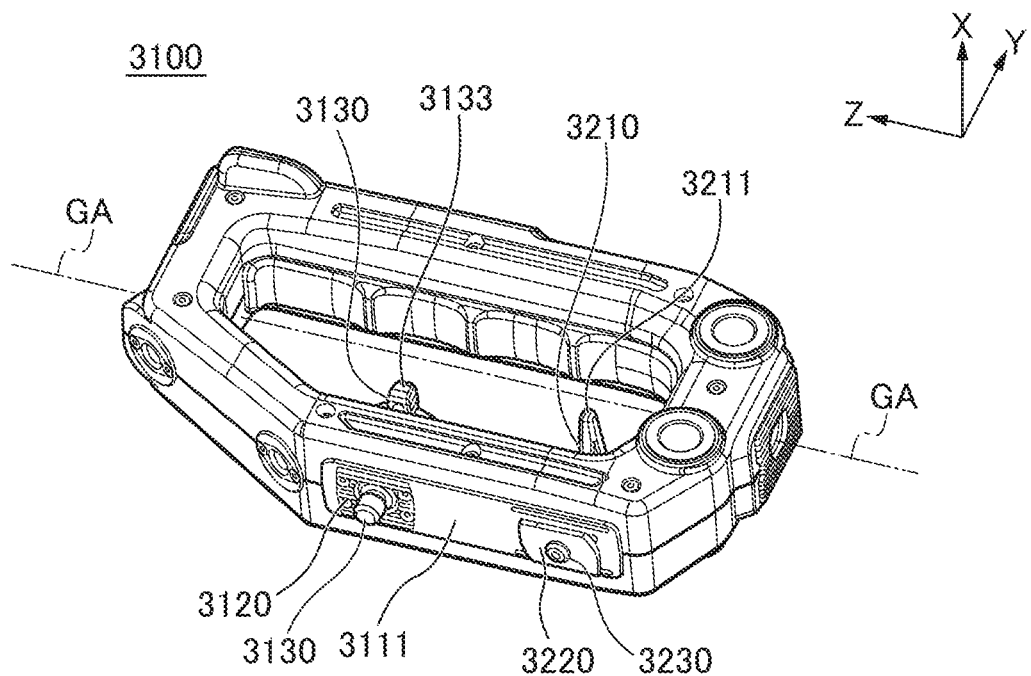
FIG. 21A is a perspective view of the handle.

FIG. 21A is a perspective view of the handle 3100. An attachment surface 3111 provided in the handle 3100 corresponds to the attachment surface 1111 (see FIG. 4A) provided in the handle 1100, and is opposed to an upper surface of the apparatus body 3000 when the handle 3100 is attached to the apparatus body 3000. A second fitting portion 3120 and a first screw through-hole 3129 of the handle 3100 are configured similar to the second fitting portion 1120 and the first screw through-hole 1129 (see FIG. 4A) of the handle 1100, respectively.

Figure 21B:
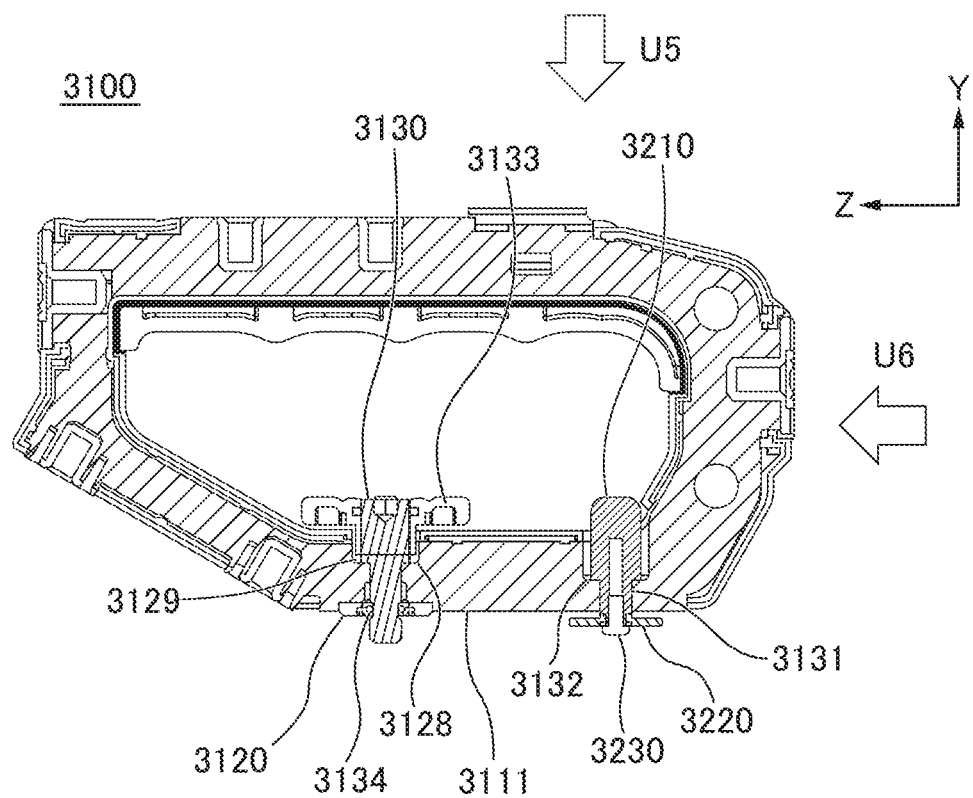
FIG. 21B is a cross-sectional view of the handle.

FIG. 21B is a cross-sectional view showing a cross-section which includes GA-GA in FIG. 21A and is orthogonal to the attachment surface 3111. In the center of the second fitting portion 3120, the fixing screw 3130 is provided in a state retained by an O ring 3134 such that it is prevented from dropping off from the first screw through-hole 3129 having a first bearing surface 3128. The second screw through-hole 3131 has a second bearing surface 3132. The handle fixing lever 3210 is inserted through the second screw through-hole 3131. The handle fixing lever 3210 has a lever portion 3211 provided, for manual rotation, such that it extends in a direction substantially orthogonal to the rotational axis of the handle fixing lever 3210 (see FIG. 21A). The lever portion 3211 has a tip end formed into a thin beak shape. The handle fixing lever 3210 is fastened to an engaging piece 3220 as an engagement member for engagement with the accessory shoe 3010, with a screw 3230, such that it is prevented from dropping off from the second screw through-hole 3131. The engaging piece 3220 is rotated in unison with the lever portion 3211.

Figure 22A:
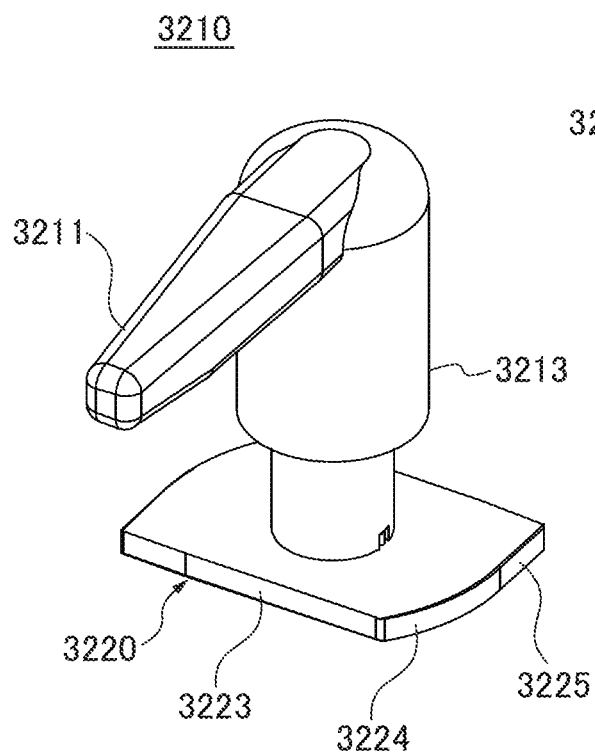
FIG. 22A is a perspective view of a handle fixing lever.
Figure 22B:
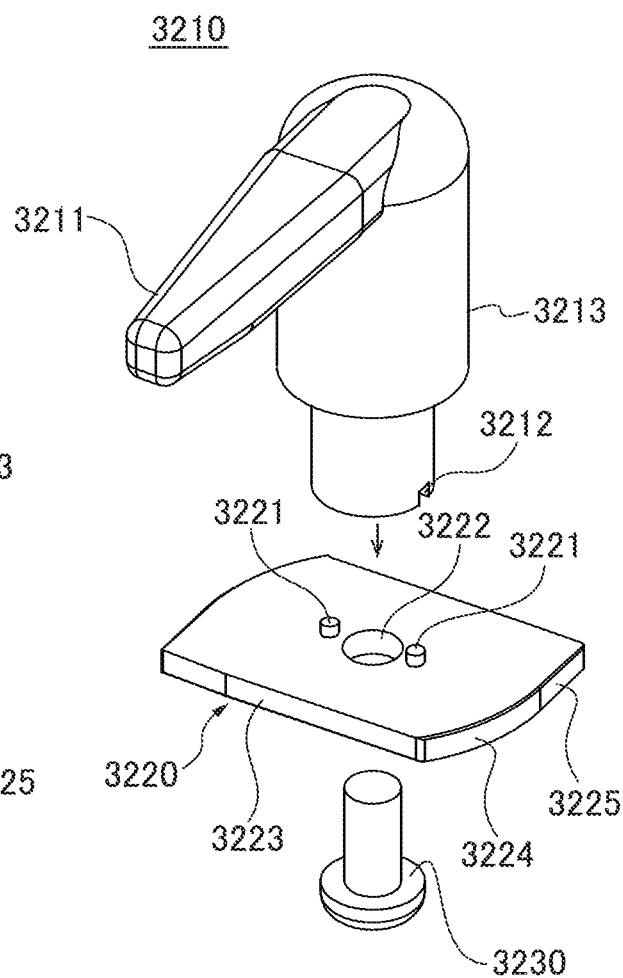
FIG. 22B is an exploded perspective view of the handle fixing lever.

FIGS. 22A and 22B are a perspective view and an exploded perspective view of the handle fixing lever 3210, respectively. As shown in FIG. 22B, a lever-side body 3213 of the handle fixing lever 3210 is formed with two groove portions 3212. Two protruding portions 3221 of the engaging piece 3220 are fitted in these groove portions 3212, respectively, and further, the engaging piece 3220 is fastened to the lever-side body 3213, with the screw 3230 inserted through a screw hole 3222.

Figure 23:
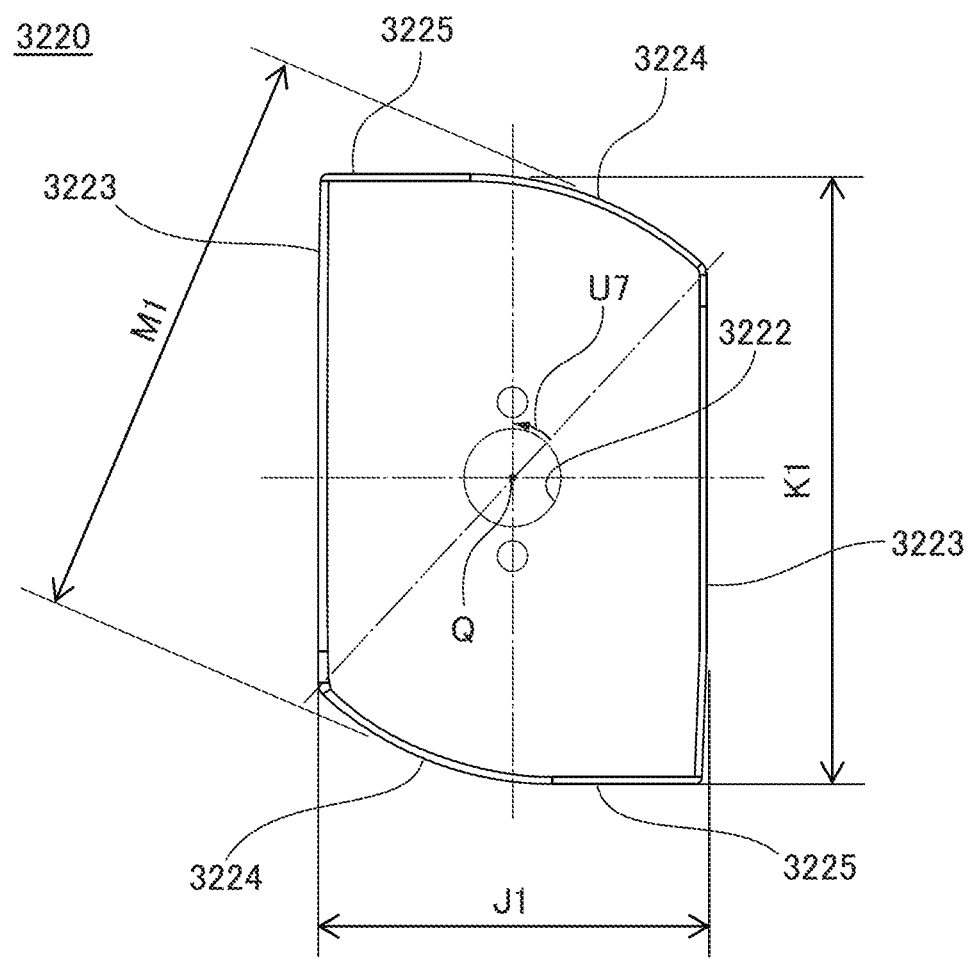
FIG. 23 is a view of an engaging piece.

FIG. 23 is a view of the engaging piece 3220, as viewed from an upper side of the handle 3100 (side indicated by an arrow U5 in FIG. 21B; the +Y side). The engaging piece 3220 is rotated in unison with the lever portion 3211 about a rotation center axis Q which is the center of the screw hole 3222. The engaging piece 3220 has a substantially point-symmetrical shape about the rotation center axis Q. Dimensions of the engaging piece 3220 are set as follows so as to be engaged with the accessory shoe 3010:

As for the outer shape of the engaging piece 3220, as viewed from the direction indicated by the arrow U5, the engaging piece 3220 has inserting flat portions 3223 substantially parallel to each other. Respective ends of the inserting flat portions 3223 opposed to each other are each connected by a curved surface portion 3224 and a flat portion 3225. The curved surface portion 3224 is smoothly continuous with the flat portion 3225. An opposing distance J1 between the inserting flat portions 3223 opposed to each other is smaller (shorter) than the distance Wa (see FIG. 20B) between the pair of opposed portions 3012. The length of a line segment passing the rotation center axis Q and connecting between the curved surface portions 3224 opposed to each other is defined as an opposing distance M1 between the curved surface portions 3224. The opposing distance M1 between the curved surface portions 3224 extending about the rotation center axis Q gradually becomes larger as a rotational angle U7 becomes larger in a direction indicated by an arrow (counterclockwise direction in FIG. 23). That is, each curved surface portion 3224 has an arc shape eccentric to the rotation center axis Q. Each flat portion 3225 is formed into a linear shape. A distance between the flat portions 3225 in a direction orthogonal to the flat portions 3225 is defined as a width K1 between the flat portions 3225. The width K1 between the flat portions 3225 is slightly larger than the distance Wb (see FIG. 20B) between the pair of side walls 3014.

Therefore, a relationship expressed by J1<M1≤K1 holds between the opposing distance J1, the opposing distance M1, and the width K1. Further, the curved surface portions 3224 and the flat portions 3225 are referred to as the first opposed surfaces, and the inserting flat portions 3223 are referred to as the second opposed surfaces. At this time, the maximum length (maximum value of the opposing distance M1=the width K1) between the first opposed surfaces is longer than the distance Wb, and the minimum length (minimum value of the opposing distance M1) between the first opposed surfaces is shorter than the distance Wb.

Next, a method of attaching the handle 3100 to the apparatus body 3000 will be described. As shown in FIG. 19, a user sets the rotational position of the handle fixing lever 3210 to a position in which the handle fixing lever 3210 extends in a direction substantially orthogonal to a longitudinal direction (Z direction) of the handle 3000, in advance. This state is referred to as the unlocked state. Next, the user brings the handle 3100 into contact with the apparatus body 3000 from a direction indicated by an arrow U2 and then fastens the operation knob 3133 of the fixing screw 3130 by rotating the same in a direction indicated by an arrow U3. This causes the first fitting portion 3020 and the second fitting portion 3120 to be fitted to each other and the fixing screw 3130 to be screwed into the first screw hole 3030.

Next, when the user rotates the lever portion 3211 of the handle fixing lever 3210 through approximately 90 degrees in a direction indicated by an arrow U4, the engaging piece 3220 is rotated together and is brought into engagement with the accessory shoe 3010 with a predetermined frictional force, described hereinafter with reference to FIG. 24. This state is referred to as the locked state. Thus, the handle 3100 is fixed to the apparatus body 3000 without looseness. Note that when removing the handle 3100, the user is only required to follow a procedure reverse to the above-described procedure.

Figure 24A:
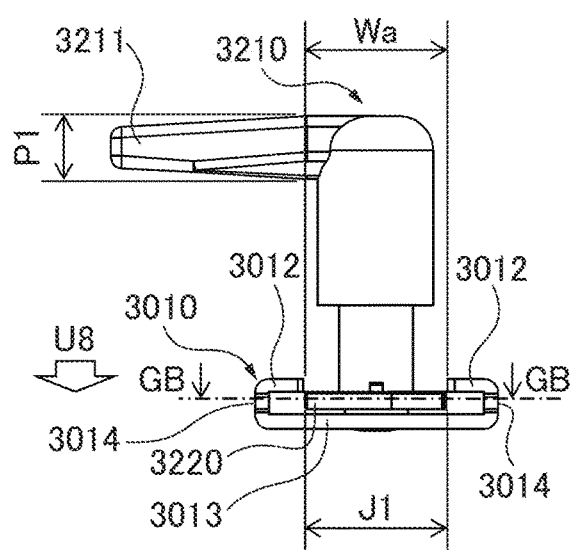
FIGS. 24A to 24E are views showing changes in a positional relationship between the engaging piece and the accessory shoe occurring as the handle fixing lever is rotated.
Figure 24B:
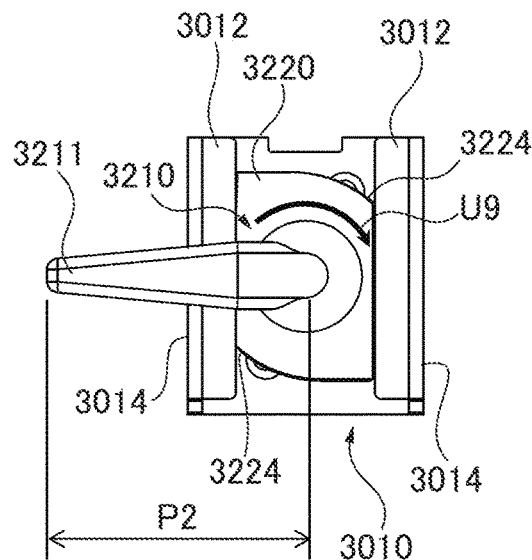
Figure 24C:
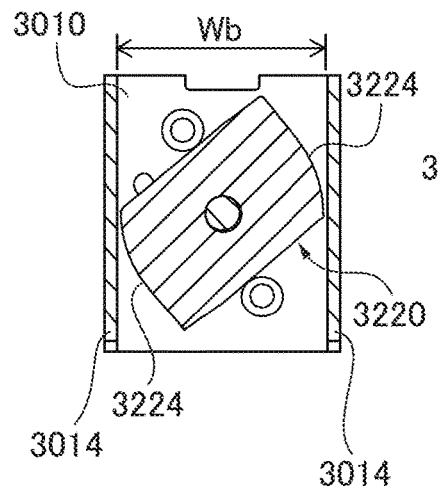
Figure 24D:
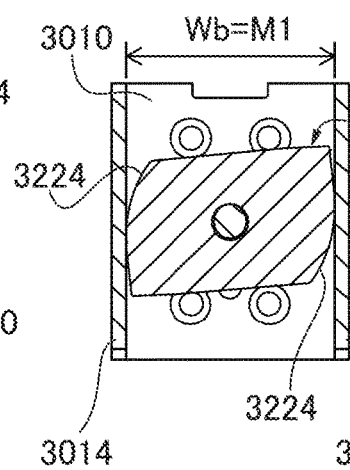
Figure 24E:
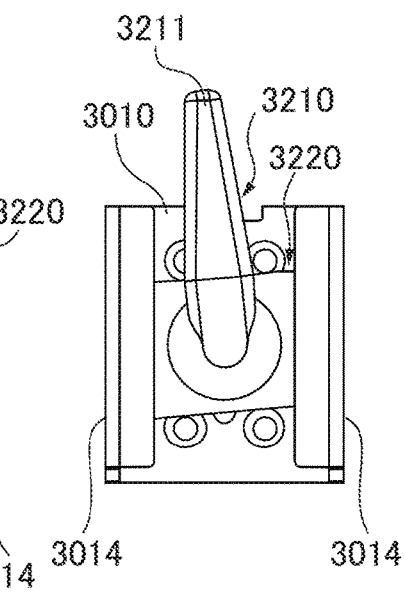

FIGS. 24A to 24E are views showing changes in a positional relationship between the engaging piece 3220 and the accessory shoe 3010, as the handle fixing lever 3210 is rotated. Particularly, FIG. 24A is a view of the handle fixing lever 3210, etc., as viewed from a side indicated by an arrow U6 (see FIG. 21B). FIGS. 24B and 24E are views of the handle fixing lever 3210, etc., as viewed from the side indicated by the arrow U5 (see FIG. 21B). FIGS. 24C and 24D are cross-sectional views taken along GB-GB in FIG. 24A. Further, FIGS. 24A and 24B show the unlocked state. FIG. 24C shows a state in which the rotational angle of the handle fixing lever 3210 satisfies a condition of M1<Wb. FIGS. 24D and 24E show a state in which the rotational angle of the handle fixing lever 3210 satisfies a condition of M1=Wb, and hence the curved surface portions 3224 are brought into contact with the pair of side walls 3014.

As shown in FIG. 24A, a height P1 of the lever portion 3211 is set to a minimum height which enables the user to rotate the lever portion 3211 by hooking his/her finger. With this, when the user inserts his/her fingers in the handle 3100 to hold the handle 3100, it is possible to prevent the fingers from being brought into abutment with the handle fixing lever 3210. Since J1<Wa holds as mentioned above, in the unlocked state, the user can insert the handle 3100 into the accessory shoe 3010 by displacing the engaging piece 3220 in a direction indicted by an arrow U8.

When the user rotates the lever portion 3211 in a direction indicted by an arrow U9 in FIG. 24B (same as the direction indicted by the arrow U4 in FIG. 19A) from the unlocked state, the engaging piece 3220 is rotated in unison therewith. When the engaging piece 3220 is rotated, the curved surface portions 3224 (see FIG. 23) of the engaging piece 3220 gradually approach the pair of side walls 3014 (see FIG. 24C), and then the curved surface portions 3224 are brought into contact with the pair of side walls 3014 (see FIGS. 24D and 24E). With this, even in a case where a force of pulling up the handle 3100 in a direction indicted by an arrow U1 in FIG. 18 is applied, it is possible to prevent the rear part of the handle 3100 from being lifted up from the apparatus body 3000 or an excessive force from being applied to the fixing screw 3130.

When the engaging piece 3220 is further rotated in the direction indicted by the arrow U9, a frictional force of a predetermined magnitude or more acts between the curved portions 3224 and the pair of side walls 3014, whereby the handle fixing lever 3210 is shifted to the locked state (see FIG. 18). This makes it possible to prevent the engaging piece 3220 from being loosened in a direction opposite to the direction indicted by the arrow U9 when vibrations or an impact are/is applied to the image capturing system 3001. Note that the engaging piece 3220 can be rotated to an angle at which the flat portions 3225 are brought into contact with the pair of side walls 3014. In the state in which the flat portions 3225 are brought into contact with the pair of side walls 3014, it can be said that the engagement piece 3220 is held by being sandwiched between the pair of side walls 3014.

Incidentally, as shown in FIG. 24B, a distance from the rotation center axis Q to the tip end of the lever portion 3211 is defined as a length P2. A distance from the rotation center axis Q to each curved surface portion 3224 is equal to (M1)/2. The length P2 is set to be longer than the distance (M1)/2. With this, the rotational force in the direction indicted by the arrow U9, which is generated by rotating the lever portion 3211, can be effectively transferred to the engaging piece 3220 based on the principle of leverage. Therefore, even when the rotational operation force applied by the user for fastening the lever portion 3211 is small, it is possible to generate a large frictional force between the engaging piece 3220 and the accessory shoe 3010. Note that it is preferable that the length P2 of the lever portion 3211 is set to a length with which a frictional force is generated to such a degree as will enable the user to easily switch between the locked state and the unlocked state, while preventing the engaging piece 3220 from being loosened or uncontrollably rotated even when vibrations or an impact are/is applied to the image capturing system 3001.

Note that in the locked state, when focusing on the shape of the handle fixing lever 3210 again, the lever portion 3211 extends only in one direction. This makes it possible to reduce a space occupied when the lever portion 3211 is rotated. That is, it is possible to prevent the lever portion 3211 from interfering with the other part of the handle 3100 when the user switches between the unlocked state and the locked state. Further, the lever portion 3211 is accommodated within a width N (see FIG. 18) of the handle 3100 in the locked state. This makes it possible to prevent, when another accessory is attached to third screw holes 3032, the lever portion 3211 from interfering with the other accessory.

Thus, the user can easily switch between the unlocked state and the locked state only by rotating the handle fixing lever 3210 through approximately 90 degrees. In the locked state, since a predetermined frictional force is generated between the engaging piece 3220 and the accessory shoe 3010, it is possible to fix the engaging piece 3220 to the accessory shoe 3010 without looseness. Further, the fixing screw 3130 is screwed to fit the first fitting portion 3020 and the second fitting portion 3120 to each other, whereby it is possible to fix the handle 3100 to the apparatus body 3000 without looseness. Note that fastening using the fixing screw 3130 is not necessarily required.

According to the present embodiment, the engaging piece 3220 formed into the plate shape point-symmetrical with respect to the rotation center axis Q rotates about the rotation center axis Q in unison with the lever portion 3211. The opposing distance M1 between the curved surface portions 3224 of the first opposed portions (3224 and 3225) of the engaging piece 3220 continuously changes in the rotational direction, and is longer than the distance Wa between the pair of opposed portions 3012. When the lever portion 3211 is rotated in a state in which the engaging piece 3220 is inserted into the accessory shoe 3010, a frictional force is generated between the first opposed portions and the pair of side walls 3014. With this, attachment of the handle 3100 to the apparatus body 3000 is completed. Therefore, it is possible to easily attach the handle 3100 to the apparatus body 3000 without requiring any tool. What is more, since the opposing distance J1 between the inserting flat portions 3223 (second opposed surfaces) of the engaging piece 3220 is shorter than the distance Wa, the user can easily insert the engaging piece 3220 into the accessory shoe 3010 from between the pair of opposed portions 3012.

Further, since the minimum length (the minimum value of the opposing distance M1) between the first opposed surfaces (3224 and 3225) is shorter than the distance Wb, the engaging piece 3220 can be gradually brought into contact with the pair of side walls 3014 when the engaging piece 3220 is rotated. Further since the width K1 between the flat portions 3225 is larger than the distance Wb (see FIG. 20B) between the pair of side walls 3014, an appropriate frictional force acts between the flat portions 3225 and the pair of side walls 3014, whereby it is possible to prevent the handle fixing lever 3210 from being unintentionally loosened.

Further, in the state in which the handle 3100 is attached to the apparatus body 3000, the direction in which the lever portion 3211 extends is substantially parallel to the pair of side walls 3014. With this, the lever portion 3211 does not become obstructive.

A fourth embodiment of the present invention differs from the third embodiment in that the handle 3100 includes an engaging piece 3320 in place of the engaging piece 3220. Other components of the handle 3100 are the same as those of the third embodiment.

FIGS. 25A and 25B are a perspective view and an exploded perspective view of a handle fixing lever 3310, respectively. The engaging piece 3320 of the handle fixing lever 3310 as an engagement member differs in shape from the engaging piece 3220 (see FIG. 23) of the handle fixing lever 3210. A lever portion 3311 corresponds to the lever portion 3211. The configuration of the apparatus body 3000 including the accessory shoe 3010 is the same as that of the third embodiment.

The handle fixing lever 3310 is formed by fixing a lever-side body 3313 and a shaft portion 3321 having the engaging piece 3320 to each other. The shaft portion 3321 has a cross-section having a shape formed by cutting an arc shape from a circular shape. The engaging piece 3320 is fixed to the shaft portion 3321 or alternatively the shaft portion 3321 and the engaging piece 3320 are integrally formed. The shaft portion 3321 is fastened to the lever-side body 3313 with a screw 3330 in a state inserted in a shaft through-hole (not shown) formed in the lever-side body 3313. An operation method for fixing the handle 3100 to the apparatus body 3000, performed by a user, is the same as that of the third embodiment. However, since the shape of the engaging piece 3320 is different from the shape of the engaging piece 3220, the action is different.

Figure 26A:
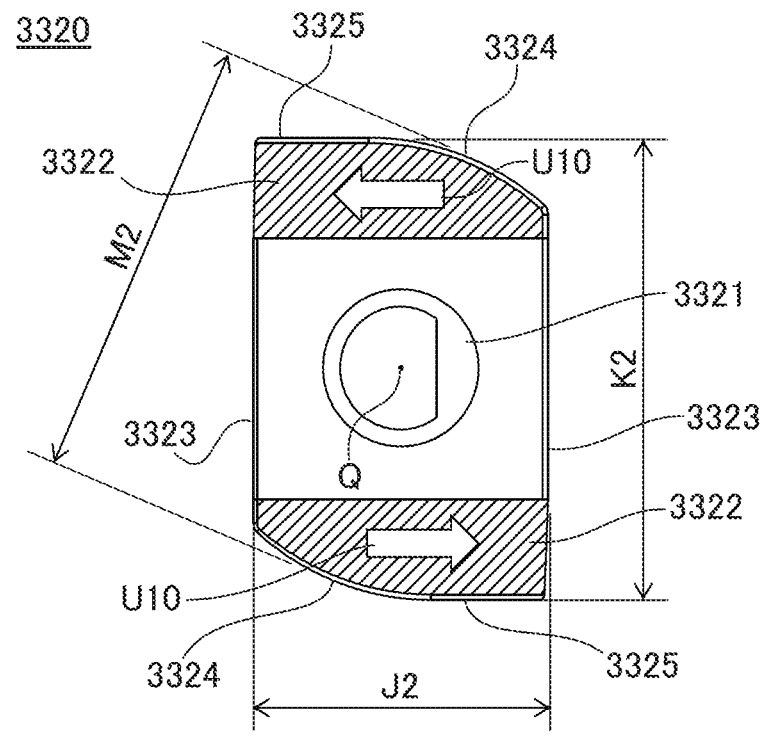
FIG. 26A is a view of an engaging piece, as viewed from the +Y direction.
Figure 26B:
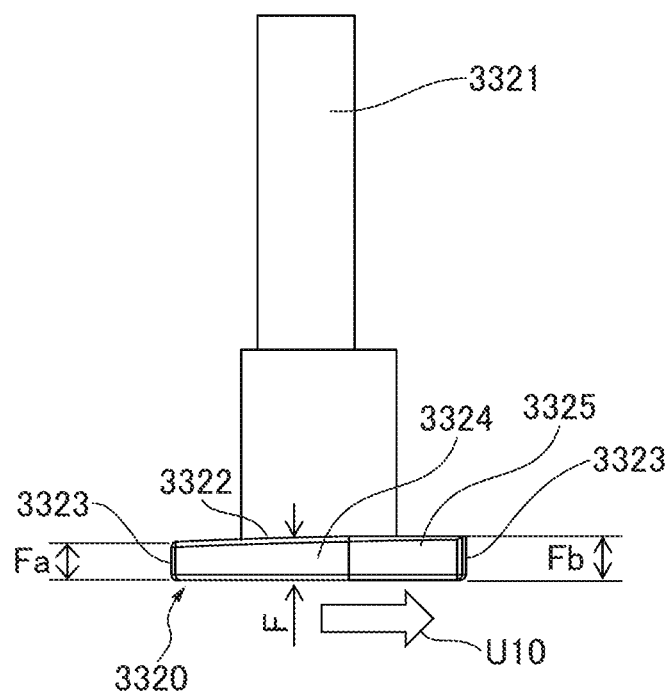
FIG. 26B is a side view of the engaging piece and a shaft portion.

FIG. 26A is a view of the engaging piece 3320, as viewed from the upper side of the handle 3100 (the side indicated by the arrow U5 in FIG. 21B; the +Y side). FIG. 26B is a side view of the engaging piece 3320 and the shaft portion 3321. The engaging piece 3320 is rotated about the rotation center axis Q in unison with the lever portion 3311. The engaging piece 3320 has a substantially point-symmetrical shape with respect to the rotation center axis Q. Dimensions of the engaging piece 3320 are set as follows so as to be engaged with the accessory shoe 3010:

As for the outer shape of the engaging piece 3320, as viewed from the direction indicated by the arrow U5, the engaging piece 3320 has inserting flat portions 3323 substantially parallel to each other. Respective ends of the insertion flat portions 3323 opposed to each other are each connected by a curved surface portion 3324 and a flat portion 3325. The curved surface portion 3324 is smoothly continuous with the flat portion 3325. The length of a line segment passing the rotation center axis Q and connecting between the curved surface portions 3324 opposed to each other is defined as an opposing distance M2 between the curved surface portions 3324. Each flat portion 3325 is formed into a linear shape. A distance between the flat portions 3325 in a direction orthogonal to the flat portions 3325 is defined as a width K2 between the flat portions 3325.

An opposing distance J2 between the inserting flat portions 3323 is the same as the opposing distance J1 (see FIG. 23) between the inserting flat portions 3223. The opposing distance M2 and the width K2 are both equal to or slightly smaller than the distance Wb (see FIG. 20B) between the pair of side walls 3014. Each curved surface portion 3324 has an arc shape and is not required to be eccentric.

The engaging piece 3320 has tapered portions 3322 (indicated by hatched areas) in regions of opposite end portions each including the curved surface portion 3324 and the flat portion 3325. A surface of each tapered portion 3322, which is opposed to an associated one of the pair of opposed portions 3012, forms an inclined surface. Each tapered portion 3322 is formed such that its thickness continuously changes in a circumferential direction about the rotation center axis Q (direction about the central axis). In other words, the tapered potion 3322 is formed such that its thickness continuously increases in a direction indicated by an arrow U10. As shown in FIG. 26B, the thickest portion of the tapered portion 3322 has a maximum thickness Fb and the thinnest portion of the same has a minimum thickness Fa. The minimum thickness Fa of the engaging piece 3320 is slightly smaller than a distance H (see FIG. 20B) between the base portion 3013 and each opposed portion 3012, and the maximum thickness Fb is slightly larger than the distance H.

The direction indicated by the arrow U10 is the same as the rotational direction of the handle fixing lever 3310 rotated when fixing the handle 3100. Therefore, the tapered portion 3322 has the thickness, denoted by symbol F, which is thinner as the tapered portion 3322 extends forward in the direction of rotation of the engaging piece 3320 about the rotation center axis Q performed in order to fix the handle 3100. Note that the thickness of part of the engaging piece 3320, which does not enter between the base portion 3013 of the accessory shoe 3010 and the pair of opposed portions 3012, is not particularly limited.

Figure 27A:
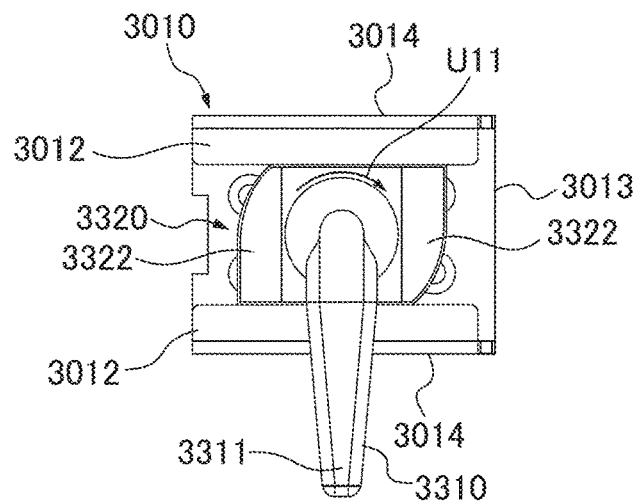
FIGS. 27A to 27E are views showing changes in a positional relationship between the engaging piece and the accessory shoe occurring as the handle fixing lever is rotated.
Figure 27B:
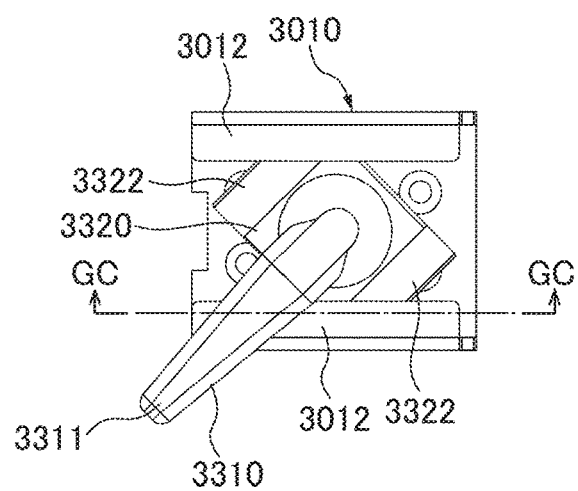
Figure 27C:
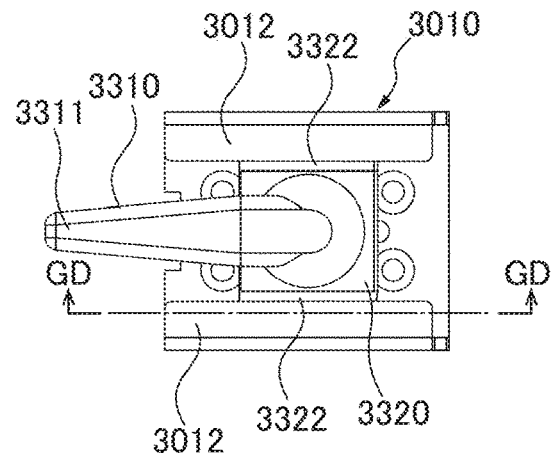
Figure 27D:
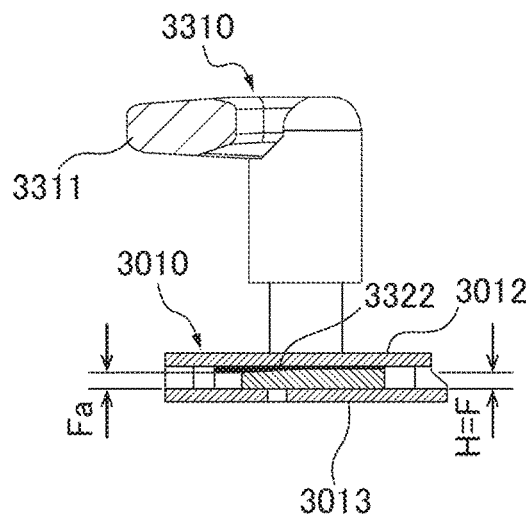
Figure 27E:
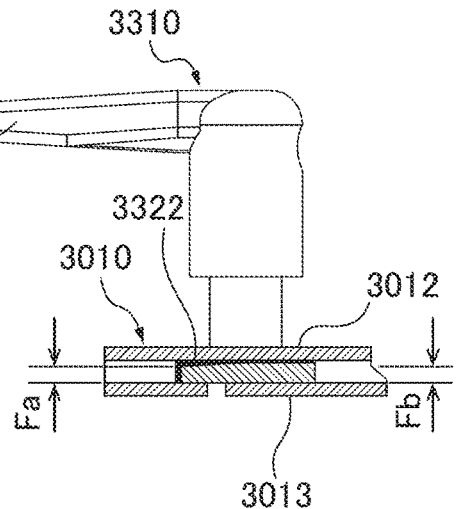

FIGS. 27A to 27E are views showing changes in a positional relationship between the engaging piece 3320 and the accessory shoe 3010 as the handle fixing lever 3310 is rotated. Particularly, FIGS. 27A to 27C are views of the handle fixing lever 3310, etc., as viewed from the side indicated by the arrow U5 (see FIG. 21A). FIG. 27D is a cross-sectional view taken along GC-GC in FIG. 27B. FIG. 27E is a cross-sectional view taken along GD-GD in FIG. 27C. FIG. 27A shows the unlocked state, and FIGS. 27C and 27E show the locked state.

In the unlocked state (see FIG. 27A), similar to the third embodiment, the engaging piece 3320 can be inserted in the accessory shoe 3010. The shape, height, and dimensions of the lever portion 3311 are the same as those of the lever portion 3211 (see FIGS. 24A and 24B). When the lever portion 3311 is rotated by a user's rotation operation through approximately 45 degrees in a direction indicated by an arrow U11 (see FIG. 27A), the state shown in FIG. 27A is shifted to a state shown in FIGS. 27B and 27D, and part of each tapered portion 3322 is opposed to an associated one of the pair of opposed portions 3012. That is, part of each tapered portion 3322 enters between the base portion 3013 and the associated opposed portion 3012.

As the lever portion 3311 is further rotated in the direction indicated by the arrow U11, the thickness F of the region of each tapered portion 3322 entered between the base portion 3013 and the associated opposed portion 3012 gradually becomes larger. Then, when the thickness F exceeds the distance H between the base portion 3013 and each opposed portion 3012, the tapered portion 3322 and the associated opposed portion 3012 are slidably engaged with each other, and the distance H between the base portion 3013 and each opposed portion 3012 is widened by the tapered portion 3322 until it becomes equal to the thickness Fb. When the lever portion 3311 is rotated through approximately 90 degrees in the direction indicated by the arrow U11 from the unlocked state, the state is shifted to the locked state (see FIGS. 27C and 27E).

In the locked state, the tapered portions 3322 are substantially sandwiched and held between the base portion 3013 and the pair of opposed portions 3012. With this, even in a case where a force of pulling up the handle 3100 in the direction indicted by the arrow U1 in FIG. 18 is applied, it is possible to prevent the rear part of the handle 3100 from being lifted up from the apparatus body 3000 or an excessive force from being applied to the fixing screw 3130. Further, in the locked state, a predetermined frictional force acts between the tapered portions 3322, the base portion 3013, and the pair of opposed portions 3012. This makes it possible to prevent the engaging piece 3320 from being loosened in a direction opposite to the direction indicted by the arrow U11 when vibrations or an impact are/is applied to the image capturing system 3001.

Thus, the user can easily switch between the unlocked state and the locked state only by rotating the handle fixing lever 3310 by approximately 90 degrees. In the locked state, the predetermined frictional force is generated between the engaging piece 3320 and the accessory shoe 3010, whereby it is possible to fix the engaging piece 3320 to the accessory shoe 3010 without looseness. Further, the fixing screw 3130 is screwed to fit the first fitting portion 3020 and the second fitting portion 3120 to each other, whereby it is possible to fix the handle 3100 to the apparatus body 3000 without looseness. Note that fastening using the fixing screw 3130 is not necessarily required.

According to the present embodiment, when the lever portion 3311 is rotated in a state in which the engaging piece 3320 is inserted in the accessory shoe 3010, the tapered portions 3322 are sandwiched and held between the base portion 3013 and the pair of opposed portions 3012. With this, attachment of the handle 3100 to the apparatus body 3000 is completed. Therefore, it is possible to obtain the same advantageous effects as provided by the third embodiment in that the handle 3100 is easily attached to the apparatus body 3000 without requiring any tool.

Further, the thickness F of each tapered portion 3322 becomes thinner as the tapered portion 3322 extends forward in the direction of rotation of the engaging piece 3320 about the rotation center axis Q performed in order to fix the handle 3100. This makes it possible to gradually shift the tapered portions 3322 to a state sandwiched and held between the base portion 3013 and the pair of opposed portions 3012 by rotating the lever portion 3311 in a direction of attaching the handle 3100.

Further, the thickness F of the engaging piece 3320 is set such that the minimum thickness Fa<the distance H<the maximum thickness Fb holds, and hence the tapered portions 3322 can be positively sandwiched and held between the base portion 3013 and the pair of opposed portions 3012.

Further, since the opposing distance J2 between the inserting flat portions 3323 of the engaging piece 3320 is shorter than the distance Wa, the user can easily insert the engaging piece 3230 from between the pair of opposed portions 3012 into the accessory shoe 3010.

Further, in a state in which the handle 3100 is attached to the apparatus body 3000, the direction in which the lever portion 3311 extends is substantially parallel to the pair of side walls 3014. With this, the lever portion 3211 does not become obstructive.

Note that although the surface of the engaging piece 3320, forming each tapered portion 3322, is a flat surface, the tapered portion 3322 may be formed as a curved surface. Alternatively, each tapered portion 3322 may be formed into a shape having both of a curved surface and a flat surface.

Further, each tapered portion 3322 may be formed by a single surface or may be formed by a plurality of surfaces which are different in shape. Further, although the inclined surface forming each tapered portion 3322 is formed on a side thereof which is opposed to the pair of opposed portions 3012, inversely, the inclined surface may be formed on a side thereof which is opposed to the base portion 3013. Alternatively, the inclined surface forming the tapered portion 3322 may be formed on both sides in the thickness direction.

Further, although the tapered portions 3322 are formed on the opposite end portions of the engaging piece 3320 each including the curved portion 3324 and the flat portion 3325 (see FIG. 26A), the tapered portion 3322 may be formed only on an end portion on one side of the engaging piece 3320. Therefore, the engaging piece 3320 is not necessarily required to be point-symmetrical with respect to the rotation center axis Q.

Note that the third embodiment and the fourth embodiment may be combined to generate a frictional force in both of the directions of the outer shape and the thickness of the engaging piece. In the third and fourth embodiments, the positional relationship between the fixing position where the handle is fixed by the fixing screw 3130 and the fixing position where the handle is fixed by the engagement claw may be reversed with respect to the front-rear direction. Alternatively, two accessory shoes may be arranged in the front and the rear, respectively, whereby the fixing method according to the third embodiment may be employed for one of the accessory shoes and the fixing method according to the fourth embodiment may be employed for the other of the accessory shoes.

Although in the embodiments, the description is given of the handle as an accessory by way of example, the present invention can be applied to any other accessories, such as a video light and an external microphone.

Note that in the above-described embodiments, descriptions of "substantially parallel", "substantially orthogonal", "substantially point-symmetrical", and "substantially the center" include, in their means, "completely parallel", "completely orthogonal", "completely point-symmetrical", and "completely the center", respectively.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-150320, filed Aug. 20, 2019, which is hereby incorporated by reference herein in its entirety.

What is claimed is:

1. An image capturing system including an image capturing apparatus body that has an accessory shoe and has a screw hole formed therein, and an accessory that is removably attached to the image capturing apparatus body,
   wherein the accessory comprises:
   a sheet metal that is engaged with the accessory shoe by being slidably inserted into the accessory shoe; and
   a fixing screw that has an operation portion which is rotationally operated, and is provided, in association with the screw hole, at a location frontward of the sheet metal in a direction of inserting the sheet metal into the accessory shoe,
   wherein the fixing screw is screwed into the screw hole in a state in which the sheet metal is engaged with the accessory shoe, whereby the accessory is attached to the image capturing apparatus body, and
   wherein a width of the sheet metal orthogonal to the inserting direction is sequentially stepwise increased from a forward side in the inserting direction.

2. The image capturing system according to claim 1, wherein the accessory shoe has a pair of hook-shaped portions that are provided at opposite ends in a width direction orthogonal to the inserting direction such that the pair of hook-shaped portions protrude therefrom, and are substantially parallel to each other, and
   wherein a width of a most forward region of the sheet metal in the inserting direction is smaller than a distance between the pair of hook-shaped portions, and a width of a most rearward region of the sheet metal in the inserting direction is larger than the distance.

3. The image capturing system according to claim 1, wherein the accessory shoe has another screw hole formed therein which is different from the screw hole, and
   wherein the accessory including the sheet metal has a through-hole formed therein which coincides in position with the other screw hole in a state in which the sheet metal is engaged with the accessory shoe.

4. The image capturing system according to claim 3, wherein a rear end of the sheet metal in the inserting direction has a rib formed thereon, and
   wherein in a case where the sheet metal is slidably inserted into the accessory shoe in a direction opposite to the inserting direction, the rib is brought into abutment with an end of the accessory shoe before the other screw hole and the through-hole coincide with each other.

5. The image capturing system according to claim 1, wherein a first fitting portion that is formed by protruding-shape portions and recessed-shape portions is provided around the screw hole, and a second fitting portion that is formed by protruding-shape portions and recessed-shape portions and is to be fitted to the first fitting portion is provided around the fixing screw.

6. The image capturing system according to claim 1, wherein the accessory is a handle.

7. An image capturing system including an image capturing apparatus body that has an accessory shoe and has a screw hole formed therein, and an accessory that is removably attached to the image capturing apparatus body,
   wherein the accessory comprises:
   a sheet metal that has an inclined surface and can be slidably inserted into the accessory shoe; and
   a fixing screw that has an operation portion which is rotationally operated, and is provided, in association with the screw hole, at a location which is different from a location of the sheet metal, and
   wherein when the fixing screw is screwed into the screw hole in a state in which the sheet metal is inserted into the accessory shoe, the inclined surface of the sheet metal is brought into engagement with the accessory shoe by a rotational force of the fixing screw, and the fixing screw is screwed into the screw hole, whereby the accessory is attached to the image capturing apparatus body.

8. The image capturing system according to claim 7, wherein the sheet metal can be inserted into the accessory shoe from a direction opposed to a surface of the image capturing apparatus body, on which the accessory shoe is arranged.

9. The image capturing system according to claim 7, wherein the accessory shoe includes a base portion fixed to the image capturing apparatus body and a hooked portion formed to protrude from the base portion, and
wherein in a state in which the sheet metal is inserted into the accessory shoe, the inclined surface is pressed toward the base portion by the hook-shaped portion by a rotational force of the fixing screw generated when the fixing screw is screwed into the screw hole, whereby the sheet metal is brought into engagement with the accessory shoe.

10. The image capturing system according to claim 7, wherein the accessory is a handle.

11. An image capturing system including an image capturing apparatus body that has an accessory shoe, and an accessory that is removably attached to the image capturing apparatus body,
wherein the accessory shoe comprises:
a base portion fixed to the image capturing apparatus body;
a pair of side walls that are formed to protrude from the base portion and are substantially parallel to each other; and
a pair of opposed portions that are formed to extend from the pair of side walls, respectively, and are opposed to the base portion,
wherein the accessory comprises:
an operation portion that is rotationally operated, and
an engagement member that is rotated about a central axis in unison with the operation portion and is formed into a plate shape which is point-symmetrical with respect to the central axis,
the engagement member including first opposed surfaces having an opposing distance therebetween which continuously changes and is longer than a width of an opening formed by the pair of opposed portions, and second opposed surfaces having an opposing distance therebetween which is shorter than the width of the opening, and
wherein when the operation portion is rotationally operated in a state in which the engagement member is inserted into the accessory shoe, a frictional force is generated between the first opposed surfaces and the pair of side walls, whereby the accessory is attached to the image capturing apparatus body.

12. The image capturing system according to claim 11, wherein a minimum length between the first opposed surfaces is shorter than a distance between the pair of side walls, and a maximum length between the first opposed surfaces is longer than the distance between the pair of side walls.

13. The image capturing system according to claim 11, wherein the first opposed surfaces each have an arc-shaped portion eccentric to the central axis.

14. The image capturing system according to claim 11, wherein the operation portion has a lever portion extending in a direction substantially orthogonal to the central axis, and
wherein in a state in which the accessory is attached to the image capturing apparatus body, the direction in which the lever portion extends is substantially parallel to the pair of side walls.

15. The image capturing system according to claim 11, wherein the accessory is a handle.

16. An image capturing system including an image capturing apparatus body that has an accessory shoe, and an accessory that is removably attached to the image capturing apparatus body,
wherein the accessory shoe comprises:
a base portion fixed to the image capturing apparatus body;
a pair of side walls that are formed to protrude from the base portion and are substantially parallel to each other; and
a pair of opposed portions that are formed to extend from the pair of side walls, respectively, and are opposed to the base portion,
wherein the accessory comprises:
an operation portion that is rotationally operated; and
an engagement member that is rotated about a central axis in unison with the operation portion,
the engagement member including tapered portions each having a thickness which continuously changes in a direction about the central axis, and
wherein when the operation portion is rotationally operated in a state in which the engagement member is inserted into the accessory shoe, the tapered portions are sandwiched and held between the base portion and the pair of opposed portions, whereby the accessory is attached to the image capturing apparatus body.

17. The image capturing system according to claim 16, wherein the thickness of the tapered portion is thinner as the tapered portion extends forward in a direction of rotation of the engagement member about the central axis performed so as to attach the accessory.

18. The image capturing system according to claim 16, wherein a minimum thickness of the tapered portion is smaller than a distance between the base portion and the pair of opposed portions, and a maximum thickness of the tapered portion is larger than the distance between the base portion and the pair of opposed portions.

19. The image capturing system according to claim 16, wherein the operation portion has a lever portion extending in a direction substantially orthogonal to the central axis, and
wherein in a state in which the accessory is attached to the image capturing apparatus body, the direction in which the lever portion extends is substantially parallel to the pair of side walls.

20. The image capturing system according to claim 16, wherein the accessory is a handle.

21. An image capturing apparatus that can be applied to the image capturing system according to claim 1.

22. An image capturing apparatus that can be applied to the image capturing system according to claim 7.

23. An image capturing apparatus that can be applied to the image capturing system according to claim 11.

24. An image capturing apparatus that can be applied to the image capturing system according to claim 16.

25. An accessory that can be applied to the image capturing system according to claim 1.

26. An accessory that can be applied to the image capturing system according to claim 7.

27. An accessory that can be applied to the image capturing system according to claim 11.

28. An accessory that can be applied to the image capturing system according to claim 16.

* * * * *